United States Patent
Bella et al.

(10) Patent No.: US 7,184,994 B2
(45) Date of Patent: Feb. 27, 2007

(54) SCALEABLE OBJECT RECOGNITION WITH A BELIEF MODEL

(75) Inventors: Ivan Bella, Gaithersburg, MD (US); Christopher Hood, Fredrick, MD (US)

(73) Assignee: Lockheed Martin Corporation, Gaithersburg, MD (US)

( * ) Notice: Subject to any disclaimer, the term of this patent is extended or adjusted under 35 U.S.C. 154(b) by 864 days.

(21) Appl. No.: 09/881,746

(22) Filed: Jun. 18, 2001

(65) Prior Publication Data

US 2002/0103776 A1    Aug. 1, 2002

Related U.S. Application Data

(60) Provisional application No. 60/212,050, filed on Jun. 16, 2000.

(51) Int. Cl.
*G06K 9/00* (2006.01)

(52) U.S. Cl. ......................................... 706/49; 382/123

(58) Field of Classification Search ............ 706/20–21, 706/25, 59–61, 1, 57, 12, 13, 16, 24, 46–49, 706/51–55; 382/156, 159, 228, 103, 140, 382/149, 151, 164–165, 170, 172, 174, 181, 382/224, 227, 229, 231; 600/408
See application file for complete search history.

(56) References Cited

U.S. PATENT DOCUMENTS

| | | | |
|---|---|---|---|
| 5,032,525 A * | 7/1991 | Lee et al. ..................... | 706/49 |
| 5,418,888 A * | 5/1995 | Alden ......................... | 706/48 |
| 5,448,502 A * | 9/1995 | Kindo et al. ................. | 382/165 |
| 5,448,722 A * | 9/1995 | Lynne et al. .................. | 706/49 |
| 5,701,400 A * | 12/1997 | Amado ........................ | 706/45 |
| 5,787,234 A * | 7/1998 | Molloy ........................ | 706/46 |
| 5,974,549 A * | 10/1999 | Golan ......................... | 713/200 |
| 6,058,206 A * | 5/2000 | Kortge ........................ | 382/159 |
| 6,571,013 B1 * | 5/2003 | Macey et al. ................ | 382/181 |
| 6,671,818 B1 * | 12/2003 | Mikurak ....................... | 714/4 |
| 2002/0083333 A1 * | 6/2002 | Frank et al. ................. | 713/200 |

OTHER PUBLICATIONS

W.-C. Lin, S.Y. C.-T. Chen; "Dempster-Shafer Reasoning for Medical Image Recognition";Proceedings of the 1991 IEEE Third International Conference on Tools for Artificial Intelligence; TAI '91; Nov. 10-13, 1991; pp. 480-487□□.*
W. Elliot, Dr. M. Schneider; "Fault Finder";Proceedings of the 1990 ACM SIGSMALL/PC symposium on Small systems; Feb. 1990; pp. 13-23.*

(Continued)

*Primary Examiner*—Anthony Knight
*Assistant Examiner*—Nathan H. Brown, Jr.
(74) *Attorney, Agent, or Firm*—Oliff & Berridge, PLC

(57) ABSTRACT

An exemplary embodiment of the present invention is directed to a system, method and computer program product for providing an object recognition blackboard system architecture. The system for recognizing objects in content can include: a blackboard comprising a plurality of experts, and data comprising original input data and data created by processing of any of the plurality of experts, and a controller operative to control the experts; a belief model, coupled to the controller, comprising a set of beliefs and probabilities associated with each belief of the set of beliefs; a belief network, coupled to the controller; and a relations subsystem, coupled to the controller.

20 Claims, 9 Drawing Sheets

OTHER PUBLICATIONS

S.-Y Chen, W.-C. Lin, C.-T. Chen; "Spatial reasoning based on multivariate belief functions"; 1992 IEEE Computer Society Conference on Computer Vision and Pattern Recognition; Proceedings CVPR '92; Jun. 15-18, 1992; pp. 624-626.*

Ng et al; Consensus in a multi-expert system; 1990 ACM annual Proceedings conference on Cooperation; Jan. 1990.*

Papadias et al; Special issue on spatial database systems; Qualitative representation of spatial knowledge in two-dimensional space; The VLDB Journal; Oct. 1994; vol. 3 Is. 4.*

Wang et al; Logical design for temporal databases with multiple granularities; ACM Transactions on Database Systems; vol. 22, Is. 2; Jun. 1997.* von Collani et al; A general learning approach to multisensor based control using statistic indices; IEEE Int'l Conference on Robotics and Automation, 2000 vol. 4; Apr. 24-28, 2000; pp. 3221-3226.*

De Natale et al; Interpretation of underwater scene data acquired by a 3-D acoustic camera; IEEE International Conference on Acoustics, Speech, and Signal Processing; vol. 2; Mar. 23-26, 1992; pp. 485-488.*

Tsukamoto et al; A methodological approach on real-time gesture recognition using multiple silhouette models; Proceedings 4th IEEE International Workshop on Robot and Human Communication; Jul. 5-7, 1995; pp. 123-128.*

Pearl; Decision making under uncertainty; ACM Computing Surveys; vol. 28, Is. 1; Mar. 1996; pp. 89-92.*

Elliott et al; "Fault Finder"; Proceedings of the 1990 ACM SIGSMALL/PC symposium on Small systems; Feb. 1990; pp. 13-23.* http://wotan.liu.edu/docis/dbl/aintel/1990_42_2_3_393_TCCOPI.htm; pp. 1.* http://bayes.cs.ucla.edu/jp_home.html; Cognitive Systems Laboratory Publications; pp. 1-24.*

Neapolitan; Is higher-order uncertainty needed?; IEEE Transactions on Systems, Man and Cybernetics Part A; vol. 26, Is. 3; May 1996; pp. 294-302.*

Watson; Blackboard Architectures and Applications review; SIGART Bulletin, vol. 1, No. 3; pp. 19-20; http://delivery.acm.org/10.1145/1060000/1056294/p19-watson.pdf?key1=1056294&key2=3510618111&coll=GUIDE&dl=GUIDE&CFID=46756301& CFTOKEN=38049324.*

Pearl; Probabilistic Reasoning in Intelligent Systems: Networks of Plausible Inference; Morgan Kaufman; 1988; pp. vii-xix.*

Jagannathan et al; Blackboard Architecture and Applications; Academic Press, Inc.; 1989; pp. vii-xvii.*

Neapolitan; Probabilistic Reasoning in Expert Systems Theory and Algorithms; John Wiley & Sons; 1990; pp. vii-xiii.*

Cooper; The computational Complexity of Probabilistic Inference Using Bayesian Belief Networks; Artificial Intelligence; vol. 42, Is. 2-3; Mar. 1990; pp. 393-405.*

Spiegelhalter; Probabilistic Reasoning in Expert Systems; American Journal of Mathematical and Management Sciences; vol. 9, Is. 3-4; 1991; pp. 191-210.*

Ng et al; Consensus in a multi-expert system; 1990 ACM annual Proceedings conference on Cooperation; Jan. 1990; pp. 351-357.*

Papadias et al; Special issue on spatial database systems; Qualitative representation of spatial knowledge in two-dimensional space; The VLDB Journal; Oct. 1994; vol. 3 Is. 4; pp. 479-516.*

Wang et al; Logical design for temporal databases with multiple granularities; ACM Transactions on Database Systems; vol. 22, Is. 2; Jun. 1997; pp. 115-170.* von Collani et al; A general learning approach to multisensor based control using statistics indices; IEEE Int'l Conference on Robotics and Automation, 2000 vol. 4; Apr. 24-28, 2000; pp. 3221-3226.*

Search Report as issued by the European Patent Office (as International Searching Authority); mailed on Mar. 8, 2002 for International Application No. PCT/US01/19446; Applicant: Lockheed Martin Mission Systems, et al.

Bosschere De Kom, et al.; "Some Low-Level Issues in the Implementation of a Shared Blackboard"; Proceedings Euromicro Workshop on Parallel and Distributed Processing; Jan. 27, 1993; pp. 88-95.

M. Piaggio & A.; "A Programming Environment for Real Time Control of Distributed Multiple Robotic Systems"; Technical Report, DIST Laboratorium; Jul. 23, 1999; Online—Internet: http:\\wynona.laboratorium.dist.unige.

J. Archibald; "Flexibility in Blackboard System for Solving Dynamic Resource-Constrained Scheduling Problems"; School of Computing and Information Systems; 1996; Online—Internet: http:\\citeseer.nj.nec.com\cache\lpapers\cs\7055\.

C. Hood; "Application of Blackboard Technology to Allow Non-Linear OCR Processing"; Symposium on Document Image Understanding, 1997, XP00101033637 (entire document).

Wei-Chung et al; "Dempster-Shafer Reasoning For Medical Image Recognition"; Proceedings of the international Conference on Tolls for Artificial Intelligence, San Jose, Nov. 5-8, 1991; Los Alamitos, CA; IEEE Computer Soc, US vol. Conf. 3.

Clement V et al; "Interpretation of Remotely Sensed Images in a Context of Multisensor Fusion Using a Multispecialist Architecture"; IEEE Transactions on Geoscience and Remote Sensing, IEEE Inc., New York, US, vol. 31, No. 4, Jul. 1, 1993; pp. 779-791 XP000413026; ISSN: 0196-2892; Section: "III. A Real World Modeling" Abstract, Figure 1.

Search Report as issued by the European Patent Office (as International Searching Authority); mailed Mar. 8, 2002 for International Application No. PCT/US01/19446; Applicant: Lockheed Martin Mission Systems, et al.

C. Hood; "Application of Blackboard Technology to Allow Non-Linear OCR Processing"; Symposium on Document Image Understanding, 1997. Note to Examiner: Reference not enclosed.

Wei-Chung Lin et al.; "Dempster-Shafer Reasoning for Medical Image Recognition"; IEE Computer Society, U.S., vol.— Conference 3; Nov. 10, 1991; pp. 480-487; Los Alamitos, California. Reference not enclosed.

Clement, V., et al.; "Intrpretation of Remotely Sensed Images in a Context of Multisensor Fusion Using a Multispecialist Architecture"; IEE Transactions on Geoscience and Remote Sensing; Jul. 1, 1993; vol. 32, No. 4, pp. 779-791; New York, New York.

Bosschere De Kom, et al.; "Some Low-Level Issues in the Implementation of a Shared Blackboard"; Proceedings Euromicro Workshop on Parallel and Distributed Processing; Jan. 27, 1993; pp. 88-95.

M. Piaggio & A.; "A Programming Environment for Real Time Control of Distributed Multiple Robotic Systems"; Technical Report, DIST Laboratorium; Jul. 23, 1999; Online—Internet: http:\\wynona.laboratorium.dist.unige.

J. Archibald; "Flexibility in Blackboard System for Solving Dynamic Resource-Constrained Scheduling Problems"; School of Computing and Information Systems; Aug. 1996; Online—Internet: http:\\citeseer.nj.nec.com\cache\lpapers\cs\7055\.

C. Hood; "Application of Blackboard Technology to Allow Non-Linear OCR Processing"; Symposium on Document Image Understanding, 1997, XP00101033637 (entire document); pp. 408-417.

Clement V et al.; "Interpretation of Remotely Sensed Images in a Context of Multisensor Fusion Using a Multispecialist Architecture"; IEEE Transactions on Geoscience and Remote Sensing, IEEE Inc., New York, US, vol. 31, No. 4, Jul. 1, 1993; pp. 779-791 XP000413026; ISSN: 0196-2892; Section: "III. A Real World Modeling" Abstract, Figure 1.

Search Report as issued by the European Patent Office (as International Searching Authority); mailed on Mar. 8, 2002 for International Application No. PCT/US01/19446; Applicant: Lockheed Martin Mission Systems, et al.

Bosschere De Kom, et al.; "Some Low-Level Issues in the Implementation of a Shared Blackboard"; Proceedings Euromicro Workshop on Parallel and Distributed Processing; Jan. 27, 1993; pp. 88-95.

M. Piaggio & A.; "A Programming Environment for Real Time Control of Distributed Multiple Robotic Systems"; Technical Report, DIST Laboratorium; Jul. 23, 1999; Online—Internet: http:\\wynona.laboratorium.dist.unige, pp. 1-20.

J. Archibald; "Flexibility in Blackboard System for Solving Dynamic Resource-Constrained Scheduling Problems"; School of Computing and Information Systems; Aug. 1996; Online—Internet: http:\\citeseer.nj.nec.com\cache\lpapers\cs\7055\ pp. 1-15.

* cited by examiner

FIG. 5A: Original Image
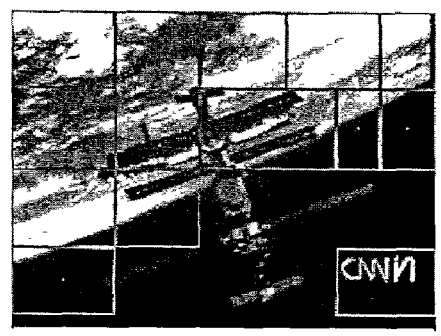
FIG. 5B: Expert Region0Finder
FIG. 5C: Expert Region1Finder
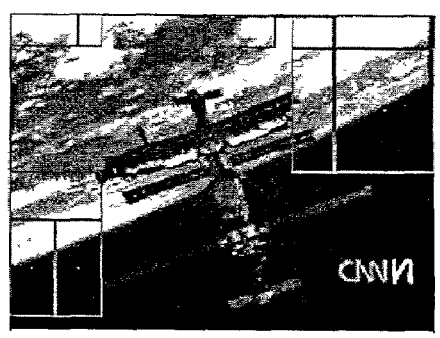
FIG. 5D: Expert Region2Finder

SCALEABLE OBJECT RECOGNITION WITH A BELIEF MODEL

CROSS-REFERENCE TO RELATED APPLICATION

This patent application is a Non-Provisional Patent Application of related Provisional Patent Application Ser. No. 60/212,050, "Scaleable Object Recognition Using a Belief Model," to Bella, et al., filed Jun. 16, 2000, the contents of which are incorporated herein by reference in their entirety.

BACKGROUND OF THE INVENTION

1. Field of the Invention

The present invention relates generally to expert systems and more particularly to recognition systems.

2. Related Art

Conventional image recognition systems are not well suited to recognizing arbitrary objects. The sheer number of possible objects to be recognized, and the infinite variety of representations, relations, views and scale give rise to a multitude of intricate problems. In addition, the sources of raw image data are quite large. For example, images that may need to be analyzed by a company or government agency can be captured from various content sources including. e.g., the worldwide web (WWW), newspapers, magazines, flyers, cameras, airplanes, missiles, people, signs, buildings, maps and various video sources such as, e.g., newscasts, documentaries, camcorders, teleconferences, digital and analog video, people, and locations. A scaleable approach in terms of database size and the number of recognizable objects is needed to adequately filter and route this data.

Conventional object recognition solutions have shortcomings. The conventional solutions are geared towards recognizing specific objects of interest. The conventional solutions do not handle arbitrary images and do not easily scale to larger domains in terms of the numbers of objects they recognize.

What is needed then is a solution that provides adequate scaleability in terms of speed, accuracy, and domain size.

SUMMARY OF THE INVENTION

An exemplary embodiment of the present invention is directed to a system, method and computer program product for providing an object recognition blackboard system architecture.

In an exemplary embodiment of the present invention, the system for recognizing objects in content can include a blackboard comprising a plurality of experts, and data comprising original input data and data created by processing of any of the plurality of experts, and a controller operative to control the expert a belief model, coupled to the controller, comprising a set of beliefs and probabilities associated with each belief of the set of beliefs a belief network, coupled to the controller and a relations subsystem, coupled to the controller.

In an exemplary embodiment, the experts can include expert object recognizers including experts such as, region identification experts; color region experts; a corner recognizer; a closed curve recognizer; a roof recognizer; a text recognizer; simulated experts; microphone recognizer; space suit recognizer; satellite recognizer; a geometric shape recognizer; a building recognizer; an egg recognizer; a dice recognizer; a person recognizer; a face recognizer; or a product recognizer.

In an exemplary embodiment, the data can include, relations data; expert status data; image subsection data; and the belief model.

In an exemplary embodiment, the controller can be configured to be operative to choose chosen experts from the plurality of experts which are to be executed to be operative to schedule execution of the chosen experts or to be operative to execute the chosen experts.

In an exemplary embodiment, the blackboard can further include storage for receiving an input image or a reporter operative to output results of processing.

In an exemplary embodiment, the belief model can include a set of rules deduced from a learning system which describes how different classes recognized by the system are related to each other spatially and physically.

In an exemplary embodiment, the belief model is operative to predict existence of a shadow object in an image even if there are no specific experts capable of recognizing the shadow object.

In an exemplary embodiment, the belief network is operative to combine beliefs in output data output by the experts and probabilities drawn from the belief model into a single belief for a given object.

In an exemplary embodiment, the relations subsystem is operative to determine how returned objects returned by the experts are related to each other.

In an exemplary embodiment, the relations subsystem is operative to determine spatial relations.

In an exemplary embodiment, the spatial relations include types including, e.g., a north type, a south type, an east type, a west type, a contains type, a contained by type, or an adjacent to type.

In an exemplary embodiment, the relations subsystem is operative to determine temporal relations.

In an exemplary embodiment, the temporal relations include types including: a before type, an after type, or an exists with type.

In an exemplary embodiment, the content can include: video; an image; digitized content; or a frame.

In an exemplary embodiment, the belief model is generated by a learning system.

In an exemplary embodiment, the learning system includes: truth data files for deducing beliefs, probabilities and shadow objects; a learning system controller; or a statistics space controlled by the controller.

In an exemplary embodiment, the learning system is operative to assist in integrating a new expert wherein the new expert has been created, encapsulated, compiled, a stub function has been added to the blackboard, if output is new has been added to the belief model, and a blackboard rule has been added to control when the new expert will be executed.

In an exemplary embodiment, the belief network is a Bayesian Network a mean probability or a Dempster-Shafer Network.

In an exemplary embodiment, the belief model includes rules operative to be used to make a determination whether or not one of the experts should be executed by search of the belief model to determine whether an adaptable threshold of supporting evidence has been exceeded. for an execution supportability rule that evaluates outputs of currently executing experts.

In an exemplary embodiment, the belief model is operative to model expected object associations, to weigh relative object positions, and to tie a probability or belief value to those associations.

In an exemplary embodiment, the belief network is operative to combine the belief model with hypotheses generated by the experts to form belief values for hypothesized objects.

In another exemplary embodiment of the present invention a method of recognizing objects is disclosed including identifying classes of objects specified by a user using a Plurality of cooperative object recognition experts achieving higher accuracy from using in parallel the plurality of cooperative object recognition experts than is achievable using in serial the plurality of cooperative object recognition experts supporting scaleability of performance including supporting multiple processors developing a belief model including specifying specified associations among the objects, learning learned associations among the objects, representing the specified and learned associations, and forming a belief network wherein the belief network is at least one of a Bayesian Network and a Dempster Shafer Network and deducing shadow objects from the belief model.

In another exemplary embodiment, a method for adding a new expert to a blackboard is disclosed including creating an expert encapsulating the expert compiling the expert adding a stub function to a blackboard determining if output of the expert is new and if new, then adding the output's class to the blackboard, and updating a belief model by providing truth data file data to a learning system and creating a rule to control when the new expert is to be executed when supporting evidence is found to exceed an adaptable threshold.

In an exemplary embodiment, the system can include a plurality of experts a belief model and a controller operative to control processing of the plurality of expert object recognizers on image.

The belief model, in an exemplary embodiment, can model expected object associations, such as, relative object positions, and can tie a probability or belief value to those associations.

The blackboard controller in an exemplary embodiment can further include a belief network operative to combing the belief model with hypotheses generated by plurality of expert the object recognizers to form belief values for hypothesized objects.

The present invention, in an exemplary embodiment, can provide for easy modification of the belief model, and due to extensibility of the object recognition Blackboard system architecture, can be easily scaled to incorporate additional objects and new technologies.

The present invention can provide various advantages. The present invention advantageously recognizes that using a combination of the plurality of expert object recognizers more accurately recognizes certain types of objects.

Further examples of advantages include, object recognition accuracy can be gained over conventional expert object recognizers executed alone performance can be gained using parallel processing over the conventional export object recognizers executed serially relative ease of extending domain size by integration of new technologies and objects by a user and the ability to define and predict scene information and existence of objects for which specialized expert object recognizer processing does not exist.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

FIGS. 5A–5D depict an example of the output of each of the region identification experts described according to an exemplary implementation of the present invention;

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Exemplary Implementation Environment In an exemplary embodiment of the present invention, the blackboard object recognition system can include a blackboard architecture implemented as a distributed computer processing system. In one exemplary embodiment, the system can be implemented using a combination of C and CLIPS.

Introduction to Blackboard Systems

A real world blackboard system analogous to the present invention can include, e.g., a classroom full of scientists, each scientist can be sitting at a desk and can be an expert in a particular field of study. At the front of the room can be a large, blank blackboard. It is desirable that the group of scientists work together to solve a general problem. To achieve this cooperation, a controller, can be designated to go to the front of the room and write the problem to be solved on the blackboard, along with any initially known data. At this point, one or more of the scientists can realize that using the scientists' particular expertise, the scientists can perform an operation on the initially known data, which can help to solve an intermediate step of the general problem. The scientists can gain the controller's attention raise their hands to indicate that the scientists have some new data to contribute. The Controller can allow each scientist to go to the blackboard and to write down the new data that the scientist was able to deduce. After which, the scientist can return to the scientist's seat. The new data, together with information from other scientists and the original data, can hopefully cause other scientists to get ideas and gain the attention of the controller. The cycle of scientists processing current data, and the controller facilitating access calling them to the blackboard to add new data, can continue until an answer for the general problem is produced.

A blackboard system can be at its simplest level an object oriented database. However, the blackboard system is different from a normal database in that it can initiate processing based on the data stored in it in order to solve a specific type of problem. In general a Blackboard system 100 can be separated into three distinct components: the Data 102 (the information written on the metaphorical blackboard), the experts 126 (the scientists), and the controller 118 (the controller), see FIG. 1A.

Data

Figure 1A:
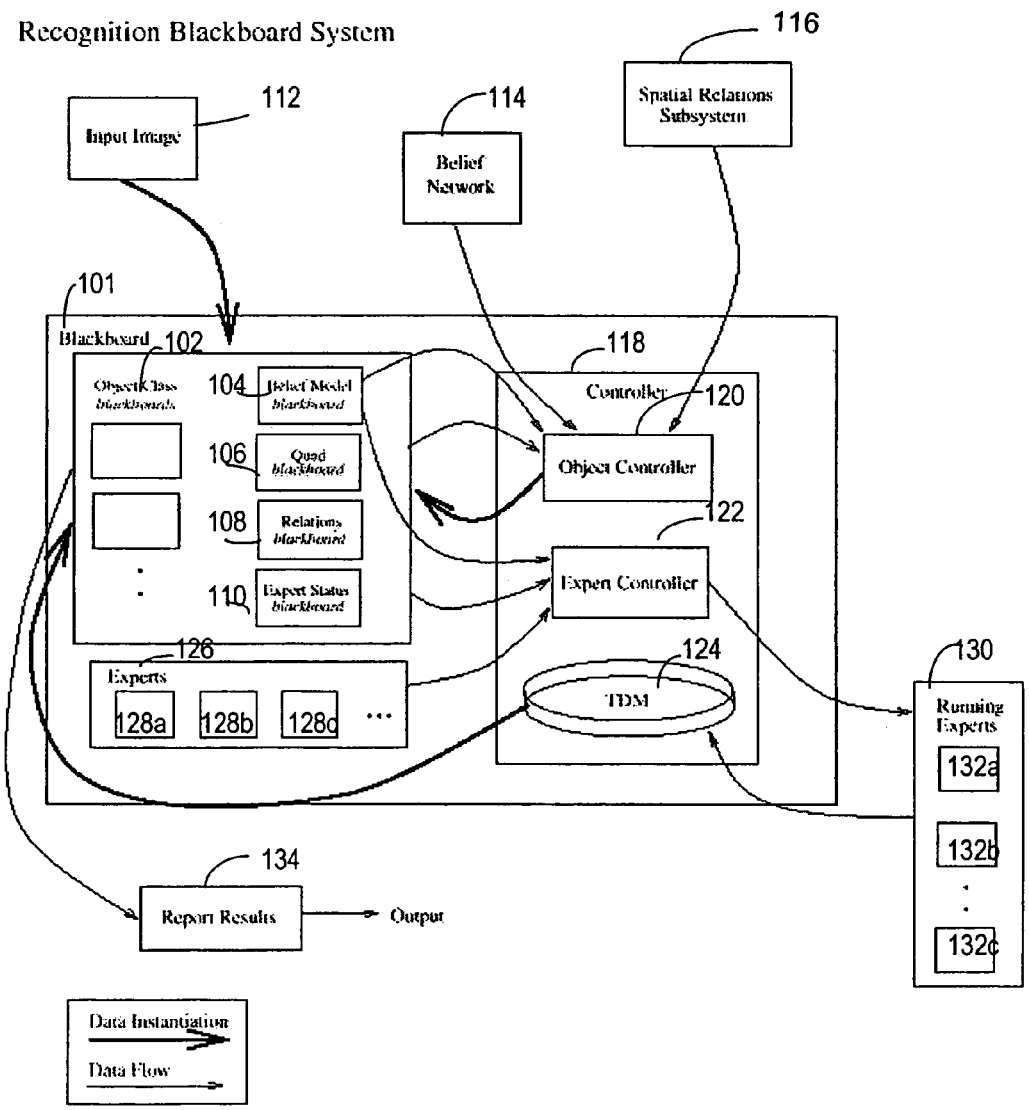
FIG. 1A depicts an exemplary embodiment of a block diagram of an image object recognition blackboard system according to the present invention illustrating data instantiation and data flow.
Figure 1B:
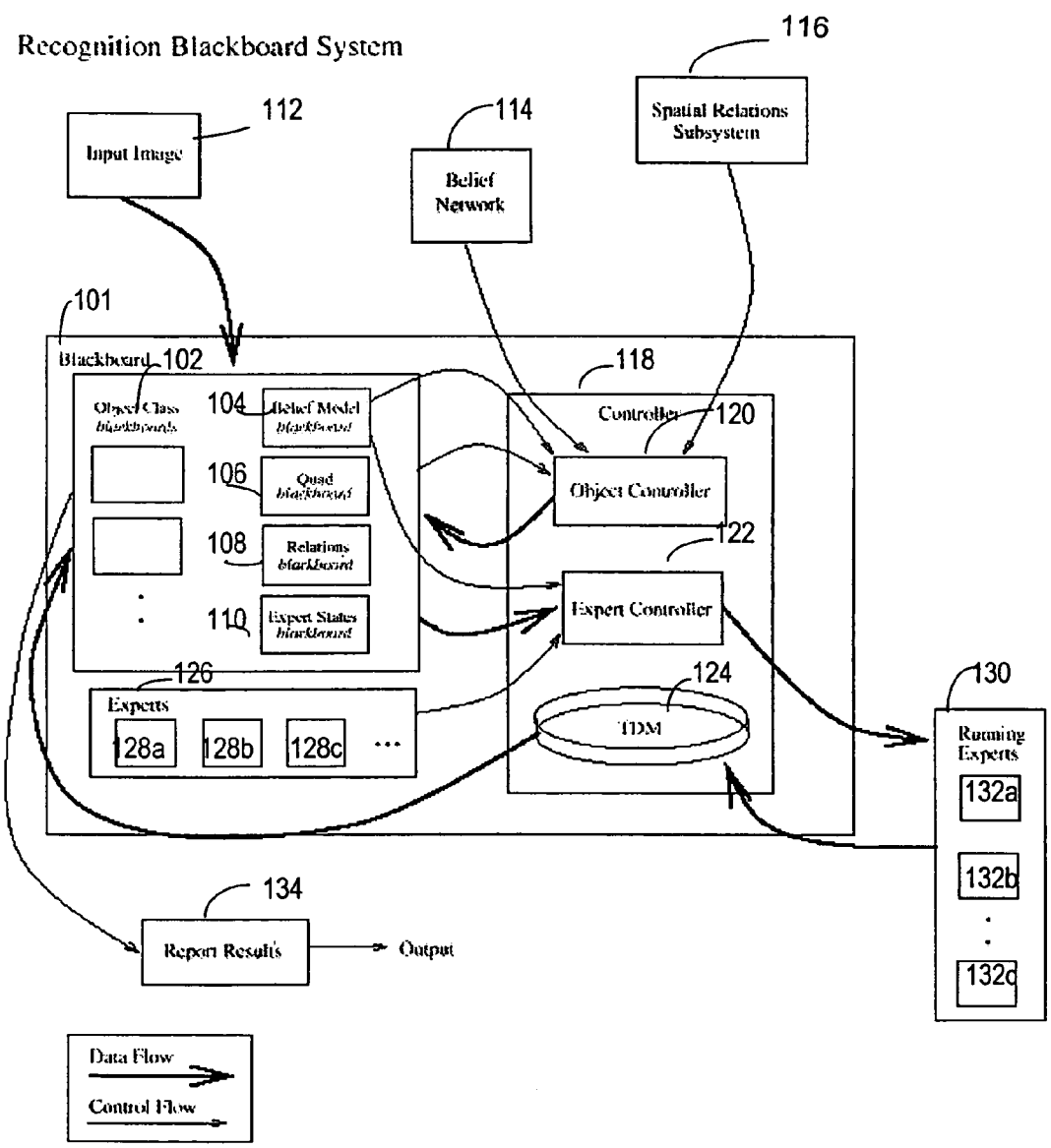
FIG. 1B depicts an exemplary embodiment of a block diagram of an image object recognition blackboard system according to the present invention illustrating data flow and control flow.

Referring now to FIG. 1A, the data of blackboard system 100 is the information used to solve a problem, and is composed of the original data, plus all data deduced during the problem solving process. The data can be grouped into different subsets that can share a common characteristic; these subsets are each referred to as a blackboard 104–110 within the present disclosure. Thus, data 102 of a blackboard system 100 is stored on a series of blackboards 104–110. In the blackboard system 100 in exemplary embodiment of the present invention, there are several examples of these smaller blackboards 104–110. Some of the exemplary blackboards hold the output of the experts 126 while others contain information pertaining to the recognition system's own inner workings.

The blackboards that hold the objects produced by the experts 126 are grouped according to the particular class of object they contain. The user can define these classes, which can be refer red to as object classes 102, when the recognition system 100 is originally setup and whenever new objects are added to the system. Each object class 102 can have a unique name and id, and encapsulates any specialized data pertaining to the object type it represents. Each object class 102 can also share several common data fields that are used by the recognition and learning systems. Some examples of possible object classes may be: Aircraft, Building, Person or Face, or the object classes may be more abstract, such as: Line, Color, or Texture. These object classes are used not only to store output from the experts, but also serve as the building blocks of the belief model. We will go into more detail on the belief model 104 below.

A special type of object class blackboard is the shadow object blackboard. Shadow objects provide a method of identifying objects that do not have specific recognition experts. A shadow object can be anything: a specific kind of vehicle, a person's face, or even a configuration of objects. Shadow objects are also used to accomplish scene prediction. Scene prediction is accomplished by defining an entire image to be a shadow object. The shadow objects are defined as part of the training data used to create the belief model 104. More information on how shadow objects are defined can be found below.

The exemplary blackboards 104–110, which contain information internal to the recognition process, are separated into four main types: relation 108, quad 106, belief-model 104, and expert-status 110. The relation blackboard 108 can contain information deduced by the spatial relation subsystem 116. The spatial relation subsystem is responsible for determining how different objects returned by the experts 126 are related to each other. In an exemplary embodiment, there can be seven types of spatial relations being determined such as, e.g.,: North, South, East, West, Contains, Contained by, and Adjacent to. Each time a new object is instantiated in one of the object class blackboards, the belief model 104 can be used to determine other object classes 102 with which it may have significant spatial relations and what those relations might be. Each possible relation checked and the details of any discovered relationships can be stored in the relation blackboard 108. It is also possible in another exemplary embodiment to add new relations to the spatial relation subsystem 116 beyond the seven currently defined.

The quad (short for quadrant) blackboard 106 contains records indicating in which quadrant of the original image an object falls, see FIG. 4 below. This information is used when trying to identify duplicate objects. Identical objects are objects in the image that have been returned by more than one expert. An image can be broken into four quadrants 402–408 in order to speed up the identification process. With the image broken into quadrants 402–408 one generally only has to check a subset of all existing objects, i.e. those in the same quadrant as a new object, when looking for duplication. The quadrants 402–408 can be defined similar to classic Cartesian quadrants, assuming the origin is at the center of the image. The exemplary embodiment can include quadrants defined such that they overlap along their common edges. This overlap can be included so that duplicate objects which appear on opposite sides of a border 410, 412 or 416, 418 do not get missed. For example, if object A is in the overlap between quadrants I 402 and IV 406, both quadrants will be searched for a duplicate of object A. The amount of overlap between quadrants is an adaptable value; we used a value of 10 pixels. Any duplicate objects found are fused to form one object in the appropriate object class blackboard. Duplicate objects can be fused by choosing one of the two objects, updating the second object's belief, via the belief network, with the first object's belief, and deleting the first object.

The belief-model blackboard 104 stores the rules, which form the belief model. These rules can be deduced by the Learning System 300 through training, and are used for various tasks during the recognition process. The rules and the belief model 104 itself will be described in more detail below.

The expert-status blackboard 110 is used to store information about which experts are available, which have already been called during processing, and which ones have accrued enough supporting evidence to be worth calling. The accumulation of evidence to support calling an expert 126 is a mechanism used to help cut down on unnecessary processing. Since some experts will take a significant amount of time to execute, we want to avoid running them when there is little chance that they will be able to recognize any objects. Therefore, during training, we attempt to determine which object classes strongly indicate the existence of other specific object classes. This information is stored in the belief model and, based on this information, experts are only called when there is sufficient evidence to support their execution. For example, suppose a good face recognition expert is available, but it takes a great deal of time and resources to execute. On the other hand a person recognition expert is also available that executes rather quickly. A rule in the belief model 104 can state that a person object is a strong indicator of the existence of a face object. Therefore, the face recognition expert will not be called automatically whenever a new image is to be processed. Instead the face recognition expert can be called only after the person recognition expert has indicated that a person object exists.

Experts

The experts 126 are a group of specialized functions or programs 128a–128c that perform operations on the data. These experts 126 can be any kind of processing. They can be complete commercial off the shelf (COTS) systems, or pieces of a COTS system, which have been pulled out and encapsulated so they can be called as stand alone processes. Experts 126 can also be functions specially written for the Blackboard system 100 itself. The principles the different experts 126 operate on can be similar or they can be completely different. Even the languages used to implement the experts can vary. In other words, the experts can be completely heterogeneous, which is one of the main strengths of the Blackboard architecture, its ability to bring together disparate types of processing in order to solve a common problem.

Instead of spending a great deal of time trying to find or develop image-processing experts, in an exemplary embodiment a set of simulated experts can be created which process simulated image files. The simulated images are composed of basic shapes such as squares, rectangles, circles, ellipses and triangles which are arranged to form different images. Three specific types of scenes were created City scenes, Nest scenes and Dice scenes (examples of each type of scene can be seen in FIG. 2). The Dice scene was designed such that it combined characteristic elements of the other two scene types, thus making it somewhat ambiguous. This was done to facilitate the testing of the scene prediction capabilities of the recognition system.

The set of simulated experts is composed of a color region recognizer, a corner recognizer, a closed curve recognizer, a building recognizer, a roof recognizer, an egg recognizer and a dice recognizer. These experts are simple text parsers that extract information from the simulated image files and return appropriate objects. In an exemplary embodiment, the recognition system is a distributed system, and therefore each expert can be an independent executable that can be remotely run on a host processor which can share a distributed file system with the server. Each expert can use three definable constants to control its behavior. The MISSRATE constant controls the probability that an expert will fail to report the existence of a valid object. The FALSEHIT constant controls the probability that an expert will return an object that doesn't exist in an image. And, the RANDOM SEED constant is used to seed a random number generator used to generate probabilities in each expert. These constants can be adjusted for each expert, giving us the ability to simulate a range of each type of recognizer, all with differing qualities.

The process for integrating these simulated experts 126 into the recognition blackboard system 100 is no different than the process would be for a real recognition expert.

The integration of a new expert can be accomplished by performing the following steps:

Step One

In step one, a software wrapper can be added which acts as an interface between the image recognition blackboard and the expert 126. The wrapper, which is mostly boilerplate code that need not be altered, is designed to act as the main function in the expert and takes care of the communication between the expert and the blackboard. The user adds any processing needed to convert the input data for an expert from its blackboard format to the format that the expert requires, and to turn the expert's output into an object (or objects) that the blackboard can store. Once this processing is added and the wrapper is installed as the main function, the expert code can be compiled to create the new expert.

Step Two

In step two a stub function can be added to the recognition blackboard itself. This is the function that will be called by the blackboard to start a given expert. Most of the stub function is boilerplate code, the user only needs to supply the name of the expert being called and to provide a set of statements to send the input data to the remote expert. The stub function must also be added to the list of functions that can be called from the blackboard.

Step Three

In step three, if the output of the new expert is of an object class already defined and trained for, this step may be skipped at the user's discretion. However, if the expert's output is new, the output's object class must be added to the blackboard and the belief model can be updated. Updating the belief model can use truth training data. The training data can be given to the learning system, which will produce an updated belief model. The learning system is described in detail below.

Step Four

In step four, a blackboard rule can be created to control when the expert is to be executed. There are two types of rules, one type of rule which executes an expert as soon as all of its input data is available and one which will not allow an expert to execute until enough evidence has accumulated to indicate that its execution is merited. Which type of rule is created can depend on the belief model. If the belief model contains rules, which show that it is possible to accumulate evidence to support the execution of an expert, the second type of rule can be created; otherwise a rule of the first type can be created. Both kinds of rules perform the same operation. They will gather the input data for the expert from the proper object class blackboards and execute the expert's stub function, passing it the input data. A detailed explanation of how the belief model is used to determine supporting evidence for the execution of an expert is discussed below.

Controller

The controller 118 is made up of code that takes care of choosing which experts 126 are to be executed and of scheduling and executing those experts. It also performs the chores of gathering the input data for the experts, placing the output of the experts on the appropriate object class blackboards, keeping the belief network 114 up to date and of checking for duplicate objects. The controller 118 makes extensive use of the belief model 104 to make decisions governing which experts can be run and when to run them. The belief model 104 is also used by the controller 118 to update the belief network 114 and to control the spatial relations processing 116. The controller 118 can be viewed as having three distinct parts: the object controller 120, the expert controller 122 and the time division multiplexer (TDM) 124.

The object controller 120 is responsible for performing the spatial relations processing, updating the belief network and for checking for duplicate objects within object class blackboards. The expert controller 122 is responsible for determining, based on the data stored in the object class blackboards, which experts should be executed. It will also execute the experts on a host processor and pass the experts their input data. The TDM 124 is used to keep track of all active or running experts 130. Since the experts can run in parallel on remote hosts, a list of all active experts 130 can be kept detailing where they are running and how they can be contacted. The TDM 124 checks on the progress of each of the experts 132a–132c in this list in turn and can receive the output from each expert 132a–132c which has completed its processing and instantiate that output on the appropriate object class blackboard(s).

The three parts 120, 122 and 124 of the controller 118 function together in a loop that drives the recognition system. The flow of control through this loop can be as follows:

The TDM 124 can check the active experts 130 list. If the TDM 124 finds entries for any experts, it will attempt to initiate contact with the experts one at a time. Any attempted contact, which is successful, will come from an expert, which has finished its processing. The TDM 124 can receive the output from the finished expert and instantiate it on the appropriate object class blackboard. The entry for that expert can then be removed from the active experts 130 list and control can pass to the object controller 120.

The object controller 120 can check for any newly instantiated objects in the object class blackboards 102. For each object found it can determine which quadrant (or possibly quadrants) of the image the object resides in and creates appropriate quad facts in the quad blackboard 106. Next, using the data stored in the quad blackboard 106, the object controller 120 can check to see if the new object is a duplicate object. If so, the duplicate objects can be fused by updating the belief of the original object and deleting the new instance of the object. If no duplicate is found, the belief model 104 can be is used to determine which object classes may have significant spatial relations to the new object and which of the seven spatial relations are significant. Each qualifying relation can be checked and a fact can be placed on the relation blackboard 108 for each relation that is present. Finally, these new relations, if any, can be used to update the belief network 114. Once all new objects have been processed control can be passed to the expert controller 122.

The expert controller 122 can check to see if there are any experts 126 who can be started based on the data currently available on the object class blackboards. The stub function for each expert qualified to start can be called. The stub function can invoke the process to start the expert, e.g., on a remote processor, gather and deliver the expert's input and create an entry in the active experts list for the expert. The entry in the expert-status blackboard 110 for the expert can be updated to show that the expert has been run. Once all qualified experts have been started, if any, a check can be made to see if the active experts 130 list is empty. If the list is empty, processing has finished and the recognition system can return its final output; otherwise control can be returned to the TDM 124, starting the loop again.

Belief Model

The belief model 104 is a set of rules deduced by the learning system 300, which describes how the different object classes that the recognition system can recognize are related to each other both spatially and statistically. All of the rules are deduced from a body of truthed training data provided to the Learning System 300 described further below with reference to FIG. 3. Each rule can relate one object class to another via one of, e.g., seven possible spatial relations: north, south, east, west, contains, contained-by and adjacent-to. Each rule also has a probability distribution and an occurrence probability attached to it that gives details on how prevalent the relationship was found to be.

The belief model 104 is the core of all of the reasoning processes that drive the recognition process. To see the different ways, in which the belief model is used, let us start with an example of what a rule from a belief model would look like:

(belief-model (class1 A) (shadow1 0) (relation X) (class2 B) (shadow2 0) (mean 2.5) (stddev 0.5) (prob 0.9))

This rule asserts that object class A has a relation X with object class B. The rule also states that throughout the training data 90 percent of the time (i.e. (prob 0.9)) if an object of class A was seen it had relation X with an object of Class B. It goes further to also state the object of class A had the relation X with a mean of 2.5 objects of class B with a standard deviation of 0.5. (In this example we are not yet using the mean and standard deviation values, but they will be useful later.) The shadow1 and shadow2 fields indicate whether or not class A and/or B are shadow object classes, respectively. In this case neither object is a shadow object. A typical belief model 104 is made up of several dozen such rules. A detailed description of how the individual rules, which comprise the belief model 104, are chosen, appears below.

The belief model 104 rules are used to make, e.g., the following decisions:

1. The determination of whether or not an expert is qualified to be executed is determined by searching the belief model 104 for a rule (or rules) which contains the output object class of the expert 126 in the class2 slot and an object class in the class1 slot for which objects have already been instantiated. In other words, the present invention, in an exemplary embodiment, can learn the probability of one object to control what expert to execute. Each such rule found is taken as evidence that there may be justification to run the expert. The probability stored in the prob slot of each supporting rule is combined to form a belief that the expert should be executed. When this belief exceeds an adaptable threshold the expert 126 will be executed. In a specific example, the probability of a square can at some threshold be indicative of the probability there is a house, separately, there can be an expert predicting the probability that there is a house. However rather than running the house expert all the time, instead the square expert can run along with other rudimentary experts, and these experts can then be used to determine whether other more processing intensive experts should be instantiated.

2. The significant spatial relations for a new object are determined by searching the belief model 104 for rules that contain the new object's object class in either the class1 or class2 slot. This indicates the spatial relation stored in the relation slot is possible between the new object and objects of the other indicated object class. In other words, given that there is a hypothesis, it can be determined what probability the experts has a valid opinion. For example, it can be determined what the probability is to see a person above a house, or the probability that a plane can be found above a house.

3. The prediction of a shadow object is accomplished by searching the belief model 104 rules whenever a new object is instantiated on one of the object class blackboards. If a rule (or rules) is found which contains the new object's object class in slot class1 and the shadow2 slot indicates that the object class stored in the class2 slot is that of a shadow object, then a shadow object of the object class stored in class2 is created in the shadow object blackboard.

4. The belief network 114 is updated by searching the belief model 104 for a rule (or rules) which shows a relationship between two objects. Each rule in the belief model 104 can be interpreted as a conditional probability, which can be used to update the belief in an object. The example rule above is interpreted as stating:

$P(\text{class } B | \text{class } A, \text{relation } X) = 0.9$

Belief Network

A belief network 114 is a directed graph in which the nodes represent a belief in different states or objects. The edges of the graph can represent relationships, which have been observed to exist, or which could possibly exist between the nodes. There are many different kinds of belief networks under study today, e.g. Bayesian networks, Dempster-Shafer networks and Markov networks. All have advantages and drawbacks that must be balanced with respect to the requirements of the problem to which the network is to be applied.

In an exemplary embodiment, a Bayesian network can be implemented. Since all of the relations described in the belief model 104 produce a conditional probability that can be directly applied in a Bayesian network a Bayesian network 114 can be used. In an exemplary implementation embodiment a singly connected Bayesian network 114 can be used. The single connected Bayesian implementation encountered some initial problems since the directed graph that was constructed to represent the relationships between objects in an image turned out to be multiply connected (i.e. there were cycles in the underlying undirected graph, A related to B which related back to A). A multiply connected Baysian network 114 implementation can be approximated by allowing the network to iterate until it converges on a solution. This approach can cause a slight increase in the execution time of the algorithm. This increase can be relatively insignificant however compared to the problem of certain nodes in the network having upwards of a dozen or more conditional parents. As the number of parent connections to a node increases the number of conditional probabilities which must be calculated to update the network increases exponentially. Methods of reducing this exponential growth do exist and remain an option.

A less complex and less accurate method of computing the belief in an object using a mean can be computed. The method is detailed below following the Bayesian network description. Details on the background and theory of Bayesian network 114, along with a more detailed explanation of possible problems are now discussed.

Bayesian Network

Historically, using a Bayesian approach to reason under uncertainty is extremely difficult because of the number of conditional probabilities that were required. Given a set of N variables, every possible relationship between every pair of variables needed to be computed. This became extremely difficult in anything other than a simple model. The necessity of calculating every possible relationship can be avoided if the independence between variables can be modeled appropriately.

Judea Pearl in *Probabilistic Reasoning for Intelligent Systems*, San Mateo, Calif.: Morgan Kaufmann, 1988, the contents of which are incorporated herein by reference in their entirety, sought to develop a model by which people could reason under uncertainty. He observed that there is an intimate connection between the way people judge causal relationships and the probabilistic relations. He also observed that these relations can be modeled using graphs and that graph separability can be used to model the conditional independence between observations. From these observations, he derived what is called the Bayesian network.

The key element in the formation of Bayesian networks is that the conditional independence between hypotheses is modeled appropriately within the network. That is to say that, if $P(S|E,I)=P(S|I)$, then S is separated appropriately from E by I as in the following graph:

$E \rightarrow I \rightarrow S$

The Judea Pearl paper provides better definition of graph separability.

The independence assumptions within the domain of the present invention, can be determined. The conditional relations that the system of the present invention produces are between objects as determined by the belief model 104, and between the experts 126 and the objects that they hypothesize. So, for example, an expert E may hypothesize the existence of an object X, which has a relationship with another object Y that may have another relationship with an object Z. The resulting graph is:

$E \rightarrow X \rightarrow Y \rightarrow Z$

The conditional independence assumptions are therefore:

$P(Y|X,E)=P(Y|X)$ and $P(Z|Y,X,E)=P(Z|Y,X)=P(Z|Y)$

The first assumption says that the existence of Y on X is conditionally independent of E, which is reasonable to assume as expert E is in the business of producing objects of type X and not of type Y. The second assumption says that the existence of Z on Y is conditionally independent of X. The justification of this assumption is that if this were not the case, then a relationship would exist between Z and X within the belief model 104.

Now, given that the assumptions are correct, standard probability propagation can be used to determine the probability of any hypothesis, given the expert that produced the hypothesis and all of its relationships to other recognized objects. Initially this was done using an implementation detailed by Neapolitan *Probabilistic Reasoning in Expert Systems*, New York: John Wiley & Sons, 1990 that assumes the underlying undirected graph is singly connected, which is to say that there are no cycles. Since the belief model 104 does not make this assumption, a multiply connected graph implementation is used. It has been shown that a probabilistic inference using multiply connected networks is NP-hard Cooper, J., "The Computational Complexity of Probabilistic Inference Using Bayesian Belief Networks," *Artificial Intelligence* 42, pp. 393–405, 1990. Hence an approximation algorithm is used.

The solution of the present invention let the singly connected algorithm converge on a solution. To understand how this was accomplished, one must understand the general algorithm. The general algorithm involves passing "messages" between the nodes within the graph. There are two types of messages. The first type includes the messages that represent the causal evidence that is passed from parent nodes to their children. The second type includes messages that represent the diagnostic evidence that is passed from children nodes to their parents. The final probability for a node is the product of the causal evidence and the diagnostic evidence. The Neapolitan paper details the actual equations. In general, the addition of a node will cause messages to propagate throughout the network. If the network has loops, then the messages will propagate indefinitely around the loop.

In order to prevent the indefinite propagation of messages, an error bound can be placed on the messages. Hence if a message was within a small fraction of the same message on a previous iteration, then the message is not passed. In an exemplary test, the error limit can be set to 0.001. This seems sufficient to produce a reasonable approximation. It should be noted that to our knowledge it has not been proven that the singly connected algorithm as detailed by Neapolitan will always converge on a solution. However, in the tests performed, a, solution was always found.

This solution still poses a significant performance problem that was initially thought to be caused by the iterative nature of the implementation. However, it was determined the performance problem lay in that when a node has a large number of parents (causal evidence), then the conditional probability of that node for every possible combination of parents is calculated. This problem is somewhat reminiscent of the historical problem with Bayesian solutions; the large number of conditional probabilities that used to be calculated before hand is now calculated algorithmically by the Bayesian network probability propagation. Methods of reducing the connectivity can be performed.

Mean Probability

A very simple belief network can be implemented, in another exemplary embodiment, that computes a simple mean probability for each object. In doing this, it was discovered that the relation facts contained in the relation blackboard 108 can provide a directed graph very similar to those built by Bayesian networks. This can be exploited and processing which computes the mean of the weighted beliefs of a node's parents and assigns the result to the node as its belief value can be added. The belief of the parent nodes can be weighted by the combination of the probability value taken from the belief model 104 rule, which related a parent to its child, and the original belief assigned to the parent node.

For example, using the belief model 104 rule given above in the section relating to the belief model, if an object of object class B was instantiated with an initial belief of 0.85 (this initial belief was assigned by the expert which created the new object) and there was an object of object class A already instantiated with an initial belief of 0.75 and they were related via relation X, then the belief in the new object is:

[(0.75*0.9)+0.85]/2=0.7625

If at a later time another object of object class A is instantiated with an initial belief of 0.875, and it is related to the previously mentioned object of object class B via relation X, then the belief in the object of object class B will be updated via the rule in the belief model section to be:

[(0.7625*2)+(0.875*0.9)]/3=0.7708

This method has some drawbacks. First, the method relies on the immediate parents of an object. There is no propagation of beliefs throughout the network. Thus an increase in the belief of a parent in no way immediately affects the belief of that parent's children. Second, if an object is mistakenly instantiated with a high belief, and there is no supporting evidence for it, then the object's belief will remain high, making it seem a much more certain prediction than it really is.

In spite of the drawbacks to this method, it does provide a reasonable and workable belief for the objects very quickly. This method can be extended in another exemplary embodiment of the present invention to replace the simple mean combination currently used with a Dempster-Shafer style combination. This extension in addition to a mechanism to propagate the beliefs produces a more reasonable belief network 114.

Learning System Architecture

The learning system 300 comprises the processes that generate the belief model 104 used in the recognition blackboard. The input to the learning system 300 is a set of image ground truth data files 302, the actual images themselves need not be given since at no time are any of the experts 126 ever executed. The output of the system will be the belief model 104 itself.

Input Data

The input data can be composed of a set of truth data files 302, one for each image in the set of training data. A truth data file 302 can contain for each object identified in the image: the object's class id, its bounding box's position and size, and a flag to indicate whether or not the object is a shadow object. Each truth data file 302 can also contain as its first line the quadrant boundaries of the original image. For example, if the original image is 500 by 300, the first line in the truth data file 302 could be:

(globals 240 140 260 160)

Figure 4:
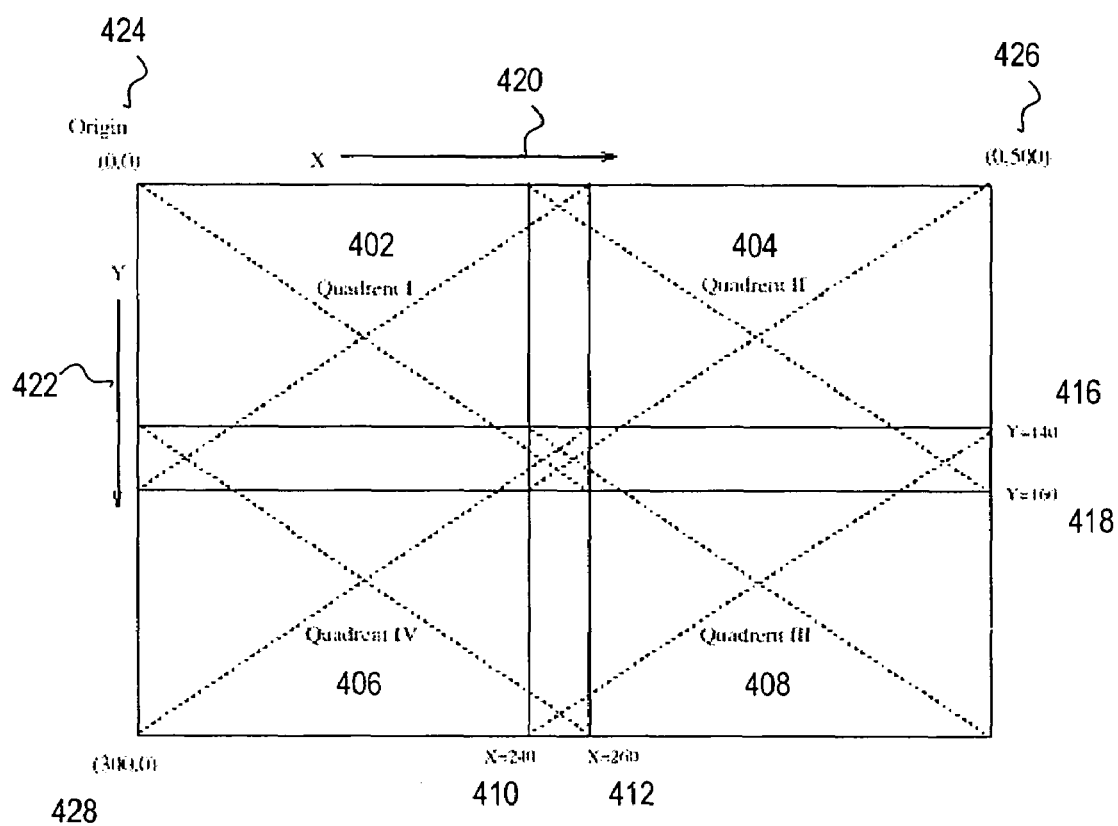
FIG. 4 depicts an exemplary embodiment of a block diagram of an exemplary four quadrant cartesian coordinate plane illustrating quadrant overlap for use in performing image object recognition according to the present invention.

This indicates that the boundaries that form the four overlapping quadrants are at X=240, x=260, Y=140 and Y=160, as can be seen in diagram 400 of FIG. 4.

Any shadow objects that are to be trained for must also be included in the truth data files 302. These objects can be added by hand in an exemplary embodiment. As with normal objects, a shadow object has an object class id, the position and size of its bounding box and a flag showing that it is a shadow object. Since scene prediction is accomplished by defining scenes as shadow objects, each training image should have at least one shadow object indicating what type of scene it represents. When defining the size of the bounding box for scene shadow objects, the size of the image is used. For example, for diagram 400 of FIG. 4, for the 500 by 300 image, the bounding box would have an upper left-hand corner of 0,0 at origin 424, and a height of 300 as shown on vertical or y-axis 422 and a width of 500 as shown on horizontal or x-axis 420.

Constructing a Statistics Space

The learning system 300 can read the truth data files 302 one at a time. The learning stem 300 can contain many of the same features that the recognition blackboard does. So as each truthed object is read, it is stored in an appropriate object class blackboard 102, it is determined in which quadrant the object resides using quad blackboard 106, a check is made for duplicate objects and the spatial relations process using relation blackboard 108 and spatial relations subsystem 116 can be performed. The important difference is that, since there is as yet no belief model, all possible spatial relations are calculated. That is to say, every time a new object is read, a check can be made for each of the exemplary seven spatial relations between the new object and every other object currently in any object class blackboard, including shadow objects. The result of each of these spatial relation checks is recorded in a table.

The table is defined such that each row represents an object class and each column represents one of the seven possible spatial relations. There will be one such table for each truthed object. Each cell in the table will therefore represent how a particular object relates to all other possible object classes, including its own. A count is kept in each cell and is incremented each time a particular spatial relation is found between the table's object and another object of a given object class 102.

Figure 3:
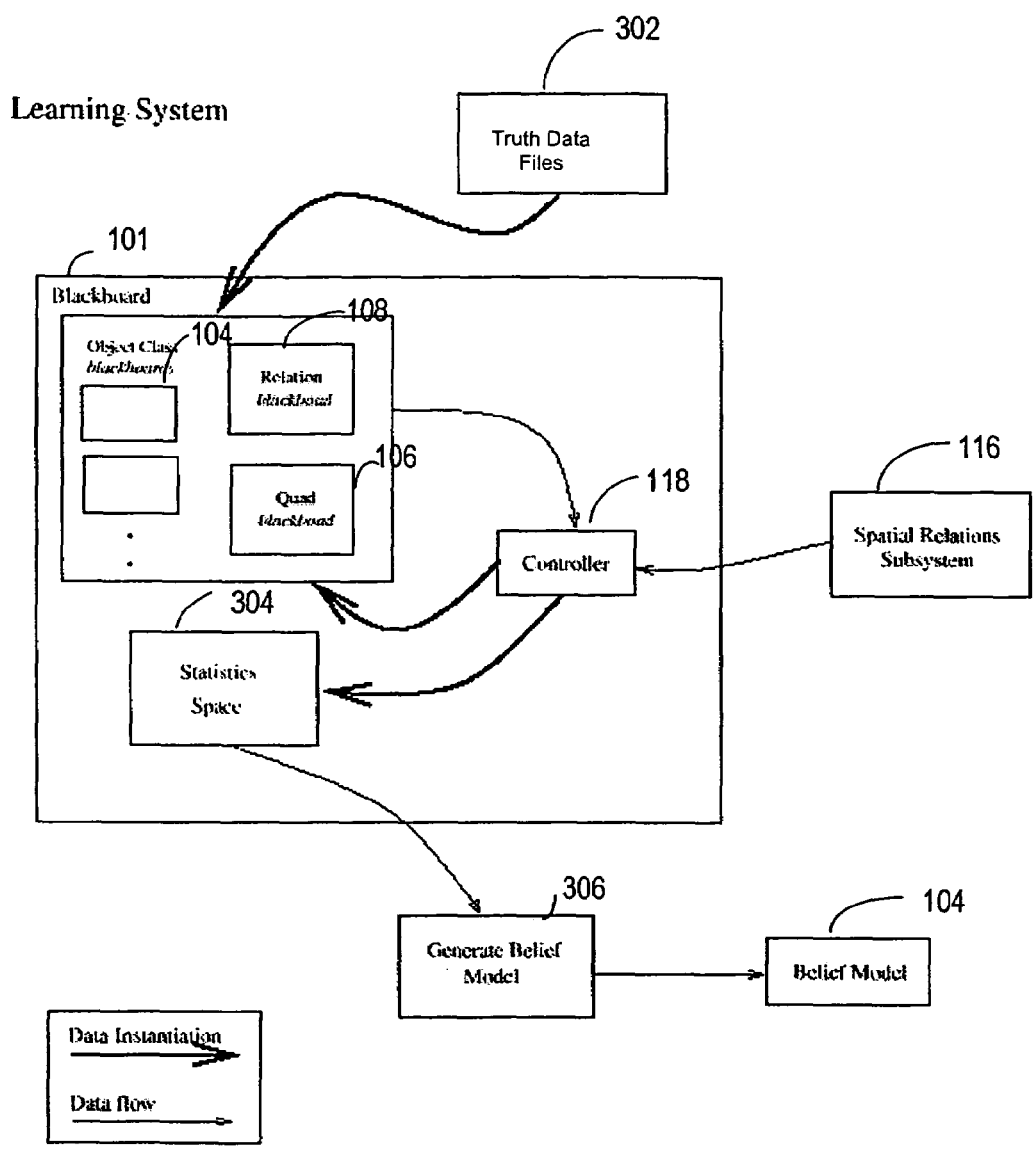
FIG. 3 depicts an exemplary embodiment of a block diagram of a learning system of the image object recognition blackboard system according to the present invention.

Once all of the data for a truth data file 302 has been read, each of the individual object tables are combined into a three dimensional table forming what is shown as a statistics space 304 in FIG. 3. Of the three axes that form the space, two represent object classes and the third represents the spatial relations. Thus the statistics space 304 relates all possible object classes to all possible object classes via all possible spatial relations. In each cell of the statistics space 304 a set of statistics can be maintained which can describe how the intersecting object classes were seen to relate to each other via the intersecting spatial relation. It should be noted that one of the two axes that represent object classes is considered the primary axis, and the statistics space 304 can only be read unidirectionally with respect to this axis. For example, if object class A lies on the primary axis, the cell in which it intersects the object class B axis and the relation X axis is taken to represent the relation: class A has relation X with class B. The same cell cannot be interpreted to represent: class B has relation X with class A.

In order to explain the statistics stored in each cell, an example is helpful. Suppose one is looking at class A on the primary axis. Consider the cell where class A intersects the class B axis and the relation X axis. The cell will contain a mean, standard deviation, probability, and two associated lists. The mean is the number of objects of class B with which the average class A object was seen to have relation X. The standard deviation is in turn calculated with respect to this mean. The probability gives the ratio of the number of class A objects observed to have relation X with at least one object of class B, to the number of class A objects observed without a relation X to any objects of class B.

The two associated lists contain information about observed states. A state is defined to be the number of objects of class B with which a specific instance of an object of class A is seen to have relation X. Thus, if object A1 has relation X with 2 objects of class B and object A2 has relation X with 5 objects of class B, objects A1 and A2 are considered to exist in two different states. One of the associated lists records each unique state observed, while the other records the number of times that state was seen to occur. This information will ultimately be used to calculate the amount of entropy that exists between object classes with respect to a relation.

After the statistics space 304 has been updated with all of the object tables for a given truth data file 302, all of the object tables for that truth data file 302 are deleted and all of the blackboards are cleared. This process of reading in a truth data file 302, creating object tables for its objects and then updating the statistics space 304 is repeated for each truth data file 302 in the training data. Once all of the truth data files 302 have been processed, the resulting statistics space 304 can be used to deduce the rules that will make up the belief model 104.

Deducing the Belief Model

Once all of the training data of truth data files 302 has been processed the statistics space 304 can be queried for statistics which describe the interaction of any two object classes with respect to any spatial relation. The rules that will make up the belief model 104 are chosen by stepping through each cell in the statistics space and applying a set criterion to the data stored within. The initial criteria are:

1. the probability of the relationship between the two object classes must be greater than a set threshold; and
2. the entropy of the relationship between two object classes must be less than 1.0.

The probability used in criteria 1 is the probability calculated for each cell in the statistics space 304 as described in the previous section. The threshold used in the exemplary embodiment to choose the rules for nonshadow objects was set to 0.6, or 60 percent. Thus, staying with the previous example, before a relationship could be included as a rule, there had to be a 60 percent or better chance that if an object of class A was seen, it would have relation X with an object of class B. Shadow objects posed a special problem that will be detailed in the special considerations section below.

Shannon Entropy

The second criterion can include calculation of the entropy between object classes A and B, and the relation X. Classically entropy is a measurement of the disorder in a system, and since the desire is to form rules which are as stable as possible, we attempt to only form rules from relations which exhibit low orders of entropy. To measure the entropy we used the Shannon entropy of a random variable. The Shannon entropy of a random variable is defined as:

$$H(x) \equiv -\sum_{x} p(x)\ln[p(x)], \quad \text{(Equation 1)}$$

Where p(x) is the probability that X is in the state x, and p(x)ln[p(x)] is defined as 0 if p(x)=0. The definition of a state of X was given in the previous section. Using this the entropy can be calculated for a cell from its stored associated lists of observed states and state counts. If there were Γ states observed for a cell, and if state x occurred Π(x) times, then the probability for state x is:

$$p(x) = \frac{\Pi(x)}{\sum_{n=1}^{\Gamma} \Pi(n)}, \quad \text{(Equation 2)}$$

The probability p(x) for each of the Γ observed states is then summed using equation 1 to give the final entropy value for that cell, which is used for criteria 2.

Special Considerations for Shadow Objects

The criteria of a probability greater than 0.6 and entropy less than 1.0 produces a very functional belief model 104 when working without shadow objects. However, it was found that in the case of some shadow objects, since they sometimes appeared very sparsely in the training data, these criteria had to be modified. Otherwise no belief model rules were created for some shadow objects. These considerations prompted changing the criteria to the following:

If an object is not a shadow object:
1. the probability of the relationship between the two object classes must be greater than the object threshold; and
2. the entropy for a relationship between two object classes must be less than 1.0.

Else, if an object is a shadow object:
3. the probability of the relationship between the two object classes must be greater than the shadow object threshold.

Again, for the exemplary embodiment the object threshold was set to 0.6. The shadow object threshold was set to 0.4. Such a small threshold value was needed in order to get rules for all the shadow objects included in the test data. It can be required in future work, in order to keep unwanted rules from being added to the belief model 104, that a threshold will need to be defined for each individual shadow object. Also note that no consideration was given to the entropy value of shadow objects. This, again, was to guarantee that rules were chosen for all shadow objects.

Tests and Data

Figure 2:
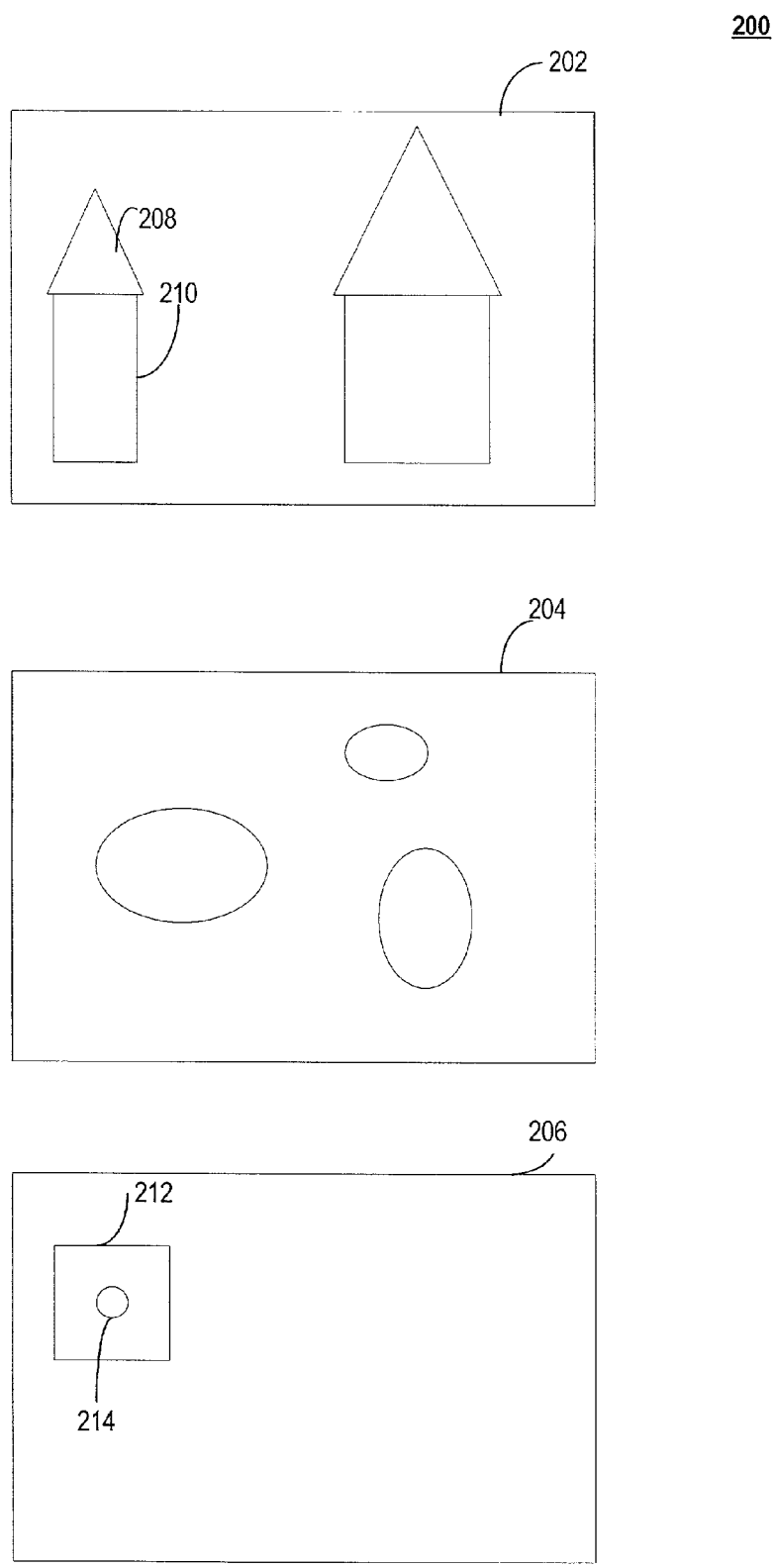
FIG. 2 depicts an exemplary embodiment of a block diagram of exemplary city, nest and dice scenes illustrative of examples of the present invention.

As stated in the experts section above with reference to FIG. 2, the images used in the testing were simulated images processed by simulated experts. The simulated image files were ASCII text files containing tagged fields that described different objects and shapes. There were five exemplary basic shapes including, e.g.,: rectangles, squares, triangles, circles and ellipses. Based on these shapes simulated recognizers were designed for an exemplary seven objects: corners, closed curves, color regions, eggs, buildings, roofs and dice. These objects were then combined to form three different scenes: City scenes, Nest scenes and Die scenes. An example of each scene can be seen in FIG. 2.

Eleven separate test images, 4 city scenes 202, 4 nest scenes 204 and 3 dice scenes 206 were created. There were four different shadow objects defined and inserted, as appropriate, into the truth images: Door, CityScene, NestScene and DiceScene. The belief model used during testing was created using truthed versions of all eleven images. The images were then reused as test data.

The belief model 104 created for testing appears as follows:

(belief-model (class1 1) (shadow1 0) (relation 5) (class2 2) (shadow2 0) (mean 1.0) (stddev 0.0) (prob 1.0))
(belief-model (class1 1) (shadow1 0) (relation 6) (class2 2) (shadow2 0) (mean 1.4807) (stddev 0.4996) (prob 1.0))
(belief-model (class1 1) (shadow1 0) (relation 6) (class2 10) (shadow2 1) (mean 0.5192) (stddev 0.4996) (prob 0.5192))
(belief-model (class1 1) (shadow1 0) (relation 6) (class2 11) (shadow2 1) (mean 0.4807) (stddev 0 4996) (prob 0.4807))
(belief-model (class1 2) (shadow1 0) (relation 6) (class2 9) (shadow2 1) (mean 0.4435) (stddev 0.4968) (prob 0.4435))
(belief-model (class1 3) (shadow1 0) (relation 6) (class2 2) (shadow2 0) (mean 1.334) (stddev 0.5023) (prob 1.0))
(belief-model (class1 3) (shadow1 0) (relation 6) (class2 5) (shadow2 0) (mean 0.6995) (stddev 0.5093) (prob 0.6748))
(belief-model (class1 3) (shadow1 0) (relation 6) (class2 9) (shadow2 1) (mean 0.6748) (stddev 0.4684) (prob 0.6748))
(belief-model (class1 3) (shadow1 0) (relation 7) (class2 2) (shadow2 0) (mean 1.3842) (stddev 0.6278) (prob 1.0))
(belief-model (class1 4) (shadow1 0) (relation 5) (class2 1) (shadow2 0) (mean 1.0) (stddev 0.0) (prob 1.0))
(belief-model (class1 4) (shadow1 0) (relation 5) (class2 2) (shadow2 0) (mean 1.0) (stddev 0.0) (prob 1.0))
(belief-model (class1 4) (shadow1 0) (relation 6) (class2 1) (shadow2 0) (mean 1.0) (stddev 0.0) (prob 1.0))
(belief-model (class1 4) (shadow1 0) (relation 6) (class2 2) (shadow2 0) (mean 1.0) (stddev 0.0) prob 1.0))
(belief-model (class1 4) (shadow1 0) (relation 6) (class2 10) (shadow2 1) (mean 1.0) (stddev 0.0) (prob 1.0))
(belief-model (class1 5) (shadow1 0) (relation 5) (class2 2) (shadow2 0) (mean 2.2917) (stddev 0.6109) (prob 1.0))
(belief-model (class1 5) (shadow1 0) (relation 5) (class2 6) (shadow2 0) (mean 0.9166) (stddev 0.2763) (prob 0.9166))
(belief-model (class1 5) (shadow1 0) (relation 6) (class2 9) (shadow2 1) (mean 1.0) (stddev 0.0) (prob 1.0))
(belief-model (class1 5) (shadow1 0) (relation 7) (class2 2) (shadow2 0) (mean 1.2917) (stddev 1.1357) (prob 0.625))
(belief-model (class1 5) (shadow1 0) (relation 7) (class2 5) (shadow2 0) (mean 0.7500) (stddev 0.6614) (prob 0.65))
(belief-model (class1 6) (shadow1 0) (relation 1) (class2 8) (shadow2 1) (mean 2.9130) (stddev 3.3220) prob 0.4782))
(belief-model (class1 6) (shadow1 0) (relation 2) (class2 2) (shadow2 0) (mean 1.1739) (stddev 1.3072) (prob 0.6086))
(belief-model (class1 6) (shadow1 0) (relation 5) (class2 2) (shadow2 0) (mean 0.9565) (stddev 0.2039) (prob 0.9565))
(belief-model (class1 6) (shadow1 0) (relation 5) (class2 3) (shadow2 0) (mean 3.1739) (stddev 1.0895) (prob 0.9565))
(belief-model (class1 6) (shadow1 0) (relation 6) (class2 2) (shadow2 0) (mean 0.9565) (stddev 0.2039) (prob 0.9565))
(belief-model (class1 6) (shadow1 0) (relation 6) (class2 5) (shadow2 0) (mean 0.9565) (stddev 0.2039) (prob 0.9565))
(belief-model (class1 6) (shadow1 0) (relation 6) (class2 9) (shadow2 1) (mean 1.0) (stddev 0.0) (prob 1.0))
(belief-model (class1 6) (shadow1 0) (relation 7) (class2 3) (shadow2 0) (mean 3.3913) (stddev 1.0524) (prob 0.9565))
(belief-model (class1 7) (shadow1 0) (relation 5) (class2 1) (shadow2 0) (mean 1.4705) (stddev 1.1939) (prob 0.7647))
(belief-model (class1 7) (shadow1 0) (relation 5) (class2 3) (shadow2 0) (mean 3.8823) (stddev 0.47058) (prob 1.0))
(belief-model (class1 7) (shadow1 0) (relation 6) (class2 2) (shadow2 0) (mean 1.0) (stddev 0.0) (prob 1.0))
(belief-model (class1 7) (shadow1 0) (relation 6) (class2 11) (shadow2 1) (mean 1.0) (stddev 0.0) (prob 1.0))
(belief-model (class1 7) (shadow1 0) (relation 7) (class2 3) (shadow2 0) (mean 4.0) (stddev 0 0) (prob 1.0))

The relations stored in the relation slot are denoted as: 1 is North, 2 is South, 3 is East, 4 is West, 5 is Contained, 6 is Contained by, and 7 is Adjacent to. The class ids stored in the class1 and class2 slots are denoted as: 1 is Closed curve, 2 is Color region, 3 is Corner, 4 is Egg, 5 is Building, 6 is Roof, 7 is Dice, 8 is Door, 9 is CityScene, 10 is NestScene, and 11 is DieScene.

Test Cases

Final testing was divided in three separate test cases. The first two test cases used one instance of each of the simulated experts. The MISSRATE, FALSEHIT and RANDOM SEED constants that control the behavior of the experts were different in each of these two test cases. The third test case used the sets of experts from the first two test cases working in tandem.

The results, in each of these cases, are presented in two tables. One table deals with nonshadow objects and the other deals with shadow objects. The nonshadow object table reports the actual number of nonshadow objects per image. The number of nonshadow objects correctly identified per image and their average belief. The number of nonshadow objects incorrectly identified (false hits) per image and their average belief. And, the number of nonshadow objects the experts failed to identify per image. The shadow object table reports the actual number of shadow objects per image. The number of shadow objects correctly identified per image and their average belief. The number of shadow objects incorrectly identified (false hits) per image and their average belief And, the successfulness of the scene prediction along with the belief of the predicted scene.

The fourth test case shows the results of the two test runs that were performed using the Bayesian network.

The most interesting result that can be seen here is that the scene prediction failed for all three Dice scenes. An examination of the raw data revealed that this occurred because in each instance that a Dice image was processed there were several false detections of both Building and Roof objects. The noise these false detections produced turned out to be enough to cause the belief in a CityScene to be higher than a DiceScene. The mistake was caused in part by the fact that there are more rules relating CityScenes to other objects in the belief model, thus giving them more supporting evidence, than there are rules relating DiceScenes to other objects. The simplified method used to calculate the belief value of an object (see section 2.1.6.2) also played a part in causing the missed predictions.

Another interesting result seen in the raw data was that, although there were several false detections in each of the nest images, there was never a false detection of a Building or Roof object. This occurred because there was never enough supporting evidence in the scene to cause either the Building or Roof recognition experts to be called, cutting down not only on processing time but also on noise. This same result was seen in t4est case 2 as well.

Finally, the table shows a successful prediction of two shadow objects in images city2 and city3, the second shadow object identified was a Door. However, the Door was also predicted in images city1 and city4, as well as all three dice images. The false shadow predictions in these images were caused by the false detection of Roof objects, because the rule in the belief model, which caused a Door Test Case 1
Results:
Expert Group 1: MISSRATE = 0.9, FALSEHIT = 0.1, Random seed = 1

| image name | city 1 | city 2 | city 3 | city 4 | dice 1 | dice 2 | dice 3 | nest 1 | nest 2 | nest 3 | nest 4 |
|---|---|---|---|---|---|---|---|---|---|---|---|
| number of nonshadow objects | 47 | 103 | 30 | 61 | 38 | 58 | 54 | 15 | 24 | 24 | 18 |
| number correct | 45 | 98 | 29 | 61 | 38 | 57 | 53 | 15 | 24 | 24 | 18 |
| avg belief | .7989 | .7964 | .8106 | .7976 | .8035 | .7929 | .7870 | .8348 | .8411 | .8409 | .8446 |
| false hits | 4 | 7 | 2 | 6 | 5 | 8 | 7 | 2 | 5 | 5 | 3 |
| avg belief | .66 | .6693 | .65 | .65 | .6835 | .6645 | .6256 | .6767 | .6653 | .6533 | .6611 |
| number missed | 2 | 5 | 1 | 0 | 0 | 1 | 1 | 0 | 0 | 0 | 0 |
| number of shadow objects | 1 | 2 | 2 | 1 | 1 | 1 | 1 | 1 | 1 | 1 | 1 |
| number correct | 1 | 2 | 2 | 1 | 1 | 1 | 1 | 1 | 1 | 1 | 1 |
| avg belief | .8049 | .6182 | .5824 | .8349 | .5715 | .6088 | .5721 | .6335 | .6457 | .6457 | .6469 |
| false predictions | 3 | 2 | 2 | 3 | 3 | 3 | 3 | 2 | 2 | 2 | 2 |
| avg belief | .4263 | .4875 | .325 | .4634 | .4709 | .4709 | .4630 | .4192 | .4324 | .4324 | .4290 |
| scene prediction | C | C | C | C | I | I | I | C | C | C | C |
| belief | .8049 | .83 | .7678 | .8349 | .6082 | .6182 | .6192 | .6335 | .6457 | .6457 | .6469 | shadow to be created, is tied to the existence of a Roof object. This effect is further demonstrated by the fact that no Door shadows were predicted in the nest images.

a different random number seed being used for test case 2's experts. These differences show how changing the MISSRATE, FALSEHIT and the RANDOM SEED allowed us to Test Case 2
Results:
Expert Group 2: MISSRATE = 0.8, FALSEHIT = 0.1, Random seed = 20

| image name | city 1 | city 2 | city 3 | city 4 | dice 1 | dice 2 | dice 3 | nest 1 | nest 2 | nest 3 | nest 4 |
|---|---|---|---|---|---|---|---|---|---|---|---|
| number of nonshadow objects | 47 | 103 | 30 | 61 | 38 | 58 | 54 | 15 | 24 | 24 | 18 |
| number correct | 43 | 93 | 25 | 58 | 32 | 49 | 49 | 13 | 22 | 22 | 16 |
| avg belief | .8141 | .8085 | .8293 | .8027 | .8187 | .8330 | .8363 | .8291 | .8526 | .8526 | .8499 |
| false hits | 1 | 6 | 0 | 4 | 1 | 5 | 2 | 0 | 2 | 2 | 0 |
| avg belief | .62 | .7383 | 0.0 | .6625 | .79 | .6701 | .62 | 0.0 | .6483 | .6483 | 0.0 |
| number missed | 4 | 10 | 5 | 3 | 6 | 9 | 5 | 2 | 2 | 2 | 2 |
| number of shadow objects | 1 | 2 | 2 | 1 | 1 | 1 | 1 | 1 | 1 | 1 | 1 |
| number correct | 1 | 2 | 2 | 1 | 1 | 1 | 1 | 1 | 1 | 1 | 1 |
| avg belief | .7957 | .6182 | .5682 | .8312 | .5137 | .6245 | .5829 | .6305 | .6489 | .6489 | .6472 |
| false predictions | 3 | 2 | 0 | 3 | 2 | 3 | 2 | 2 | 2 | 2 | 2 |
| avg belief | .3390 | .4417 | 0.0 | .4319 | .4478 | .4483 | .4657 | .3845 | .4164 | .4164 | .3937 |
| scene prediction | C | C | C | C | C | C | C | C | C | C | C |
| belief | .7957 | .8300 | .7347 | .8312 | .5137 | .6245 | .5829 | .6305 | .6489 | .6489 | .6472 |

If test cases 1 and 2 are compared you will see that more nonshadow objects were missed by the experts in test case 2, this is because of the lower MISSRATE used in test case 2's experts. Additionally it is interesting to note that in this test case the recognition system was able to correctly predict the scene in every case. A look at the raw data showed an absence of any false Building or Roof object detections for image dice1 and dice3, and only one false detection of both objects in image dice2. This lower amount of noise allowed the recognition system's scene prediction ability to function successfully for the three dice images. The difference in the number of false Building and Roof detections was a result of produce simulated experts that produce results as if they were entirely different sets of code.

It should also be noted that the city3 image had no false shadow object predictions, and the dice1 and dice3 images did not have a false Door shadow prediction, as they did in test case 1. The raw data revealed the reason for these results was, again, the absence, in these images, of any false detections by the experts of objects which would cause a shadow object to be created. It is clear from these two test cases that the prediction of shadow objects is very sensitive to noise from the false detection of objects by the recognition experts. This is an issue that must be addressed in any future work.

Test Case 3
Results:
Expert Group 1: MISSRATE = 0.9, FALSEHIT = 0.1, Random seed = 1
Expert Group 2: MISSRATE = 0.8, FALSEHIT = 0.1, Random seed = 20

| image name | city 1 | city 2 | city 3 | city 4 | dice 1 | dice 2 | dice 3 | nest 1 | nest 2 | nest 3 | nest 4 |
|---|---|---|---|---|---|---|---|---|---|---|---|
| number of noshadow objects | 47 | 103 | 30 | 61 | 38 | 58 | 54 | 15 | 24 | 24 | 18 |
| number correct | 47 | 101 | 30 | 61 | 38 | 57 | 54 | 15 | 24 | 24 | 18 |
| avg belief | .8044 | .7988 | .8118 | .7992 | .8059 | .7965 | .7957 | .8244 | .8011 | .8059 | .8375 |
| false hits | 5 | 12 | 2 | 10 | 6 | 13 | 9 | 2 | 13 | 13 | 3 |

-continued

Test Case 3
Results:
Expert Group 1: MISSRATE = 0.9, FALSEHIT = 0.1, Random seed = 1
Expert Group 2: MISSRATE = 0.8, FALSEHIT = 0.1, Random seed = 20

| image name | city 1 | city 2 | city 3 | city 4 | dice 1 | dice 2 | dice 3 | nest 1 | nest 2 | nest 3 | nest 4 |
|---|---|---|---|---|---|---|---|---|---|---|---|
| avg belief | .652 | .6756 | .65 | .6468 | .7013 | .6670 | .6241 | .6767 | .6235 | .6235 | .6611 |
| number missed | 0 | 2 | 0 | 0 | 0 | 1 | 0 | 0 | 0 | 0 | 0 |
| number of shadow objects | 1 | 2 | 2 | 1 | 1 | 1 | 1 | 1 | 1 | 1 | 1 |
| number correct | 1 | 2 | 2 | 1 | 1 | 1 | 1 | 1 | 1 | 1 | 1 |
| avg belief | .7911 | .6056 | .5670 | .8231 | .5351 | .6018 | .5656 | .6213 | .6409 | .6409 | .6368 |
| false predictions | 3 | 2 | 2 | 3 | 3 | 3 | 3 | 2 | 3 | 3 | 2 |
| avg belief | .4021 | .4679 | .325 | .4467 | .4590 | .4717 | .4661 | .4148 | .4613 | .4613 | .4285 |
| scene prediction | C | C | C | C | I | I | I | C | C | C | C |
| belief | .7911 | .8239 | .7491 | .8231 | .6101 | .6196 | .6175 | .6214 | .6409 | .6409 | .6368 |

In the third test case, the two sets of experts used in test cases 1 and 2 were allow to work together. As can be seen above, this cooperation allowed the two sets of experts to identify nearly all of the nonshadow objects, missing only three object over the course of the eleven images. This clearly demonstrates that the Blackboard architecture allowed the two sets of experts to run in parallel and merge their outputs to produce a better result than either could have on their own.

On the other hand it should be noted that, even though the number of recognized objects increased, the recognition system still failed to correctly identify the DiceScenes. The reason being, once again, noise created by false detections. Only in this test case the condition was worse, because the number of false detections increased over the number seen in either of the previous two test cases. This only makes sense, since there were twice as many experts running and therefore twice as many chances to make false detections.

Further evidence of the problem with noise can be seen in that images nest2 and nest3 have three false shadow predictions, where they only had two in test cases 1 and 2. The third shadow object is a Door. This may seem strange, since a Door shadow is only predicted if a Roof is detected, but in this case Roof objects were detected. They were false detections from the Roof recognition expert, which was called because of the combined false detections of the two separate corner recognition experts.

Test Case 4
Results:

Image: city3

| object type | number found | average belief | shadow object |
|---|---|---|---|
| Roof | 2 | 0.85 | No |
| Building | 2 | 0.87 | No |
| Corner | 14 | 0.8493 | No |
| Color | 4 | 0.8625 | No |

-continued

Image: city3

| object type | number found | average belief | shadow object |
|---|---|---|---|
| Door | 1 | 0.6099 | Yes |
| CityScene | 1 | 0.9371 | Yes |

Image: dice1

| object type | number found | average belief | shadow object |
|---|---|---|---|
| Dice | 4 | 0.8225 | No |
| Corner | 16 | 0.8369 | No |
| ClosedCurve | 7 | 0.8271 | No |
| Color | 11 | 0.8236 | No |
| DiceScene | 1 | 0.9997 | Yes |
| CityScene | 1 | 0.9245 | Yes |
| NestScene | 1 | 0.9112 | Yes |

These tests were performed on images city3 and dice1. Each test took in excess of several hours to complete because of the exponential growth in the number of conditional probabilities that needed to be computed to update the Bayesian network. This is the problem discussed in the belief network 114 section above. By comparison the average run time of the tests performed in test cases one, two and three were at most only a few minutes.

These results show that the Bayesian network belief network 114 is capable of using the belief model 104 to compute reasonable belief values for recognized objects, especially the shadow objects. A comparison of the shadow object belief values seen here to those seen test cases one, two and three illustrates that the Bayesian network was much more sure of its predictions. This may be an indication that a Bayesian network would help alleviate the problem of incorrect scene prediction produced by an excess of false object detections.

Conclusions

The use of a blackboard architecture 101 together with the concepts of a belief model 104 and a belief network 114 have combined to form a robust and flexible image recognition system 100. The blackboard architecture's ability to allow multiple experts to work together, produced a system which was able to positively identify more objects than any of the experts could have done on their own. Scalability has also been rendered somewhat less complex as a result of the present invention. By defining the set of steps needed to add new experts and objects to the domain, an experienced user can integrate new processing in a relatively short amount of time. Just a few hours are needed to integrate a new expert into the blackboard, however, if the new expert produces a new type of object, the belief model 104 must also be updated. The update requires preparing training data, which may take several more hours of work.

Through the use of the belief model 104 to drive the recognition process, an environment can be created that could deduce, to some extent, what types of recognition processing is best applied to a given image. The belief model 104 also allowed training the recognition system to predict, with a level of belief, the existence of objects within an image, even when there was no specialized processing present to detect those objects. And further, these shadow objects can also be used to train the recognition system to make predictions about the type of scene an image represents. Although some problems with shadow object prediction developed when larger levels of false detections were present, the recognition system was still able to make shadow object predictions with a better than random average of success. Refinements to the belief model 104 and an implementation of a more sophisticated belief network 114 can account for some portion of the problems presented by the false detection of objects.

The performance gained by running the experts 126 in parallel as opposed to serially can be depend on the nature of the simulated experts. Since the simulated experts 126 were merely text parsers, their execution time was less than the time needed to transmit their input and output over a distributed network. In such an environment, the network speed can be the limiting factor on how fast the system could run. Real experts whose execution times are not trivial, can be used to assist in the parallel implementation. It is believed that a number of experts have nontrivial execution times, in the parallel implementation results in improved performance.

The results detailed above suggest that this implementation can provide an improved image recognition system.

In another exemplary embodiment, belief model 104 and belief network 114 are further developed to account for the problems encountered due to false object detections, to improve the performance of the Bayesian network, and to extend the belief network including the ideas suggested in the mean probability section such as, e.g., related to a Dempster-Shafer style.

In another exemplary embodiment, the belief model 104 can be extended to another level of granularity, so that it can include details such as, e.g., the specific texture of a region or the degree of curvature of an edge.

In yet another exemplary embodiment, the provision of a more representative and comprehensive set of spatial relations can be provided.

In another exemplary embodiment, the ability to localize spatially the location of predicted shadow objects within an image can be provided.

In an exemplary embodiment, a process is provided to save and update the statistics space 304 created by the learning system 300, allowing new objects and relations to be added without having to recompute the entire statistics space 304.

In another exemplary embodiment, the present invention as applied to image recognition processing is extended to allow recognition of full motion video processing. Video image recognition includes making temporal associations between objects in different frames of the video and allowing experts such as, e.g., an object tracker and change detector to contribute in performing frame image recognition.

Rather than processing only static images, any shadow object predicted can be further determined to be spatially localized or extending from frame to frame over full motion video content. For processing video streams, the above framework can be extended to track spatial locations for shadow objects over more than one frame. A mechanism can be added allowing experts to be identified as processing video streams or as processing images, then each image could be a single frame from a video stream. The output objects from experts can be linked to the specific video frame or frames in which the objects appear. The relations subsystem can be modified to detect identical objects in different video frames and can combine the objects into one object. The controller can be modified to handle processing video streams by a) receiving and storing input video stream, b) extracting a frame from the video stream, c) sending full video stream to experts that operate on video data, d) sending an extracted frame to experts that operate on image data, e) storing output from the experts in appropriate blackboards, f) performing spatial relations tests, and other house keeping tasks, on those objects which appear within a video frame, g) if the final video frame has been processed, then processing can stop, or otherwise the next video frame can be extracted and returned to the image frame recognizer. To localize a shadow object, the current framework can be extended to allow attempting to use spatial locations and relations of detected objected, triggering prediction of shadow objects and limiting the area in which shadow objects could be in an image. The belief network can use a Dempster-Safer style network, or an efficient version of a Bayesian network.

In yet another exemplary embodiment of the present invention further detailed testing can be performed other image processing experts.

For further information relevant to the subject matter of the present invention, the reader is directed to Hood, C., "Application of Blackboard Technology to Allow Non-Linear OCR Processing," Proceedings of the 1997 Symposium on Document Image Understanding Technology, 108–117, 1997; Jagannathan, V., Dodhiawala, R., and Baum, L., *Blackboard Architectures and Applications*, San Diego, Calif.: Academic Press, Inc.,1989; Pearl, J., *Probabilistic Reasoning for Intelligent Systems*, San Mateo, Calif.: Morgan Kaufmann, 1988; and Cooper, J., "The Computational Complexity of Probabilistic Inference Using Bayesian Belief Networks," *Artificial Intelligence* 42, 393–405, 1990; and Neapolitan, R., *Probabilistic Reasoning in Expert Systems*, New York: John Wiley & Sons, 1990, the contents of which are incorporated herein by reference in their entireties.

Exemplary Application of the Present Invention

The remaining section of this disclosure summarizes the results from the application of the architecture and methods of the present invention to a real image processing application. The Blackboard architecture of the present invention was used to integrate several real image processing algorithms, replacing the simulated experts used in the present invention.

The experts integrated, in the exemplary embodiment were a text recognizer, a color region finder and three region identifiers. In addition to these, three simulated recognizers were still needed in order to create a usable belief model. Table 1, below shows the range of belief values for the objects each of these experts can return. The experts are described in more detail below.

The belief model used during testing was created by training on 22 separate color images, representing three different scene types: Generic News Scenes, Space Scenes, and Soccer Scenes. The complete belief model appears below:

TABLE 1

| Expert | Output Belief Value Range |
| --- | --- |
| Text Recognizer | 0.2353 |
| Color Recognizer | 0.0–1.0 |
| Region 0 Finder | 0.99 |
| Region 1 Finder | 0.99 |
| Region 2 Finder | 0.99 |
| Simulated Experts | 0.75–0.95 |

Ten objects were chosen as targets for recognition. Each training file was truthed manually for these objects. Each training file was also processed using the color recognizer and each of the region recognizers. The output was combined with the manual truthing of the ten target objects to form the training files used to create the belief model. The original intent was to let each of the ten target objects be represented as a shadow object; thus their existence would be determined purely through the associations of the output from the real image processing experts. However, since the overall quality of our image processing experts is still somewhat low, there were not enough significant associations between their outputs during training to form belief model rules to predict each of the ten target objects. Therefore three simulated recognizers were created and three of the ten target objects were treated as pseudo real objects. Table 2 below lists the ten target objects and indicates whether they were treated as real, pseudo real or shadow objects.

TABLE 2

| Target Object | Designation |
| --- | --- |
| Person | Shadow Object |
| Face | Shadow Object |
| Text | Real Object |
| Graphics or Video Inset | Shadow Object |
| Microphone | Pseudo Real Object |
| Earth | Shadow Object |
| Satellite | Pseudo Real Object |
| Space Suit | Pseudo Real Object |
| Soccer Field | Shadow Object |
| Soccer Ball | Shadow Object |

Each scene type is also defined to be a shadow object.

The exercise is intended to show that the methods developed according to the present invention outlined above could be successfully applied to real image data and real image processing algorithms. To this end it was desired that it be shown that real image processing experts could be integrated onto the Blackboard with a minimum amount of work, and that a useful belief model could be created using the output from these experts. In addition, it is desired to show that the belief model created could be used to predict the existence of various shadow objects, including different scene types. The output from tests run on 107 different test images and the belief model created by training on 22 training images, appear at the end of the disclosure. The data shows that it was possible to successfully integrate the real image processing experts onto the Blackboard, to process real image data using the experts and to create a useful belief model. The following sections discuss the significance of the contents image summaries and belief model that appear below. The first section discusses the image processing experts and the identification of the non-shadow objects. The next section discusses the success of the system in predicting scene types. The next section discusses shadow object prediction in general. And, the last section presents conclusions.

Non-Shadow Objects

The image processing experts produced five types of non-shadow objects; these are text objects, color region objects and three different classes of regions from the region identifiers. In addition, simulated experts were used to produce three types of pseudo real objects; these are listed on Table 2. Following is a brief discussion of each expert.

Region Identification Experts

The region identification experts used in this exercise were developed in house. The core algorithm of the experts operates by first converting the input image into a 256 level gray-scale image. Next, vertical and horizontal histograms are formed by summing pixel values along the rows and columns of the image. The histograms are analyzed to find their valleys using a moving window, and the locations of the valleys are used to form an uneven grid over the image. The mean and standard deviation of the pixel values in each of the grid regions are then calculated. Next, the regions are quantized into a predetermined number of levels based on the mean pixel value of the regions. Then the pixel standard deviation of each region is compared to a predetermined threshold, if the standard deviation is greater than the threshold the region is discarded. Accepted regions are returned as output.

The three region identification recognizers were created by choosing three different sets of predetermined thresholds and quantization levels. FIGS. 5A–5D show an example of the output of each of the region identification experts.

Since the regions returned by the region identification experts are self defining, the belief assigned to each region returned by the experts was defaulted to 0.99.

Color Region Expert

The color region expert is based on the same algorithm used in the region identification experts with some post processing added. Once the final regions have been determined, they are transposed back onto the original color image. The dominant color of each region is then determined by calculating the mean pixel value of the region in the red, green and blue bit planes. The mean of each bit plane is mapped into a 3 dimensional volume. The X, Y and Z axes of the volume represent red, green and blue levels. The volume itself is divided into eight equal sub volumes, each corresponding to a color. The color of a region is then determined according to which of the eight sub volumes its red, green and blue means map into. The belief in the color is determined according to how far away from the maximum color value of a sub region a mapped point lies. These beliefs will range from 0 to 1.

Text Recognizer

The text recognizer was created at the University of Maryland at College Park's LAMP lab. It uses a neural network to regionalize an image and then determine if there is any text present. The recognizer takes a black and white PGM format image as input, and returns a text file containing the number of text objects found along with the coordinates of a bounding box surrounding each text object. Tests were performed using our training data to determine the belief value to assign the output of the text recognizer. In these tests it was able to correctly identify 0.2353 percent of the text present. This value was used as the belief value of all objects returned by the text recognizer.

Simulated Experts

In order to be able to process all chosen target objects, three simulated recognition experts had to be created. As with the region identifiers, each of the experts is based on the same set of code, which is compiled to specifically recognize one particular object type. The three simulated experts are the Microphone recognizer, the Space Suit recognizer and the Satellite recognizer.

The simulated experts take the truth file of an image as input. They scan the truth records looking of instances of the object they were compiled to recognize. If an object of the appropriate type is found there is a 0.9 percent chance that the object will be returned. This simulates a 0.1 percent miss rate. After scanning the truth file, the expert will make a check to see if it should return a false detection. There is a random probability of between 0 and 0.20 percent that a false detection will be generated. A false detection will have a random size and position within the image. Once the false detection process is completed, the expert will return all objects detected, real and false. Each returned object will have a random belief of between 0.75 and 0.95.

Scene Predictions

Figure 6:
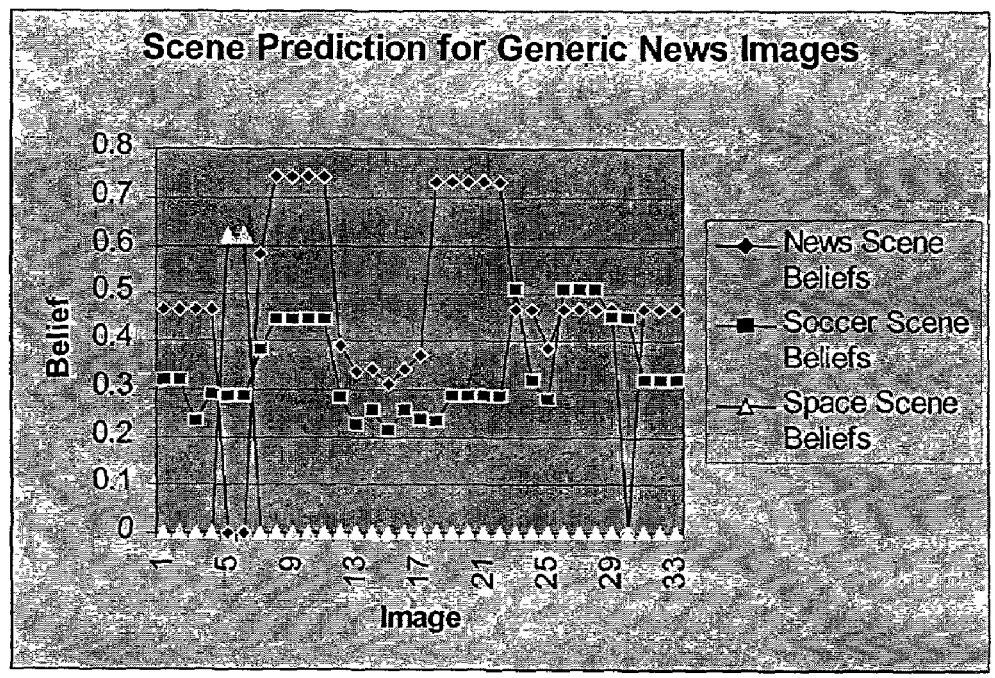
FIG. 6 depicts a chart graphing belief versus images for scene prediction for generic news images according to an exemplary embodiment of the present invention.
Figure 7:
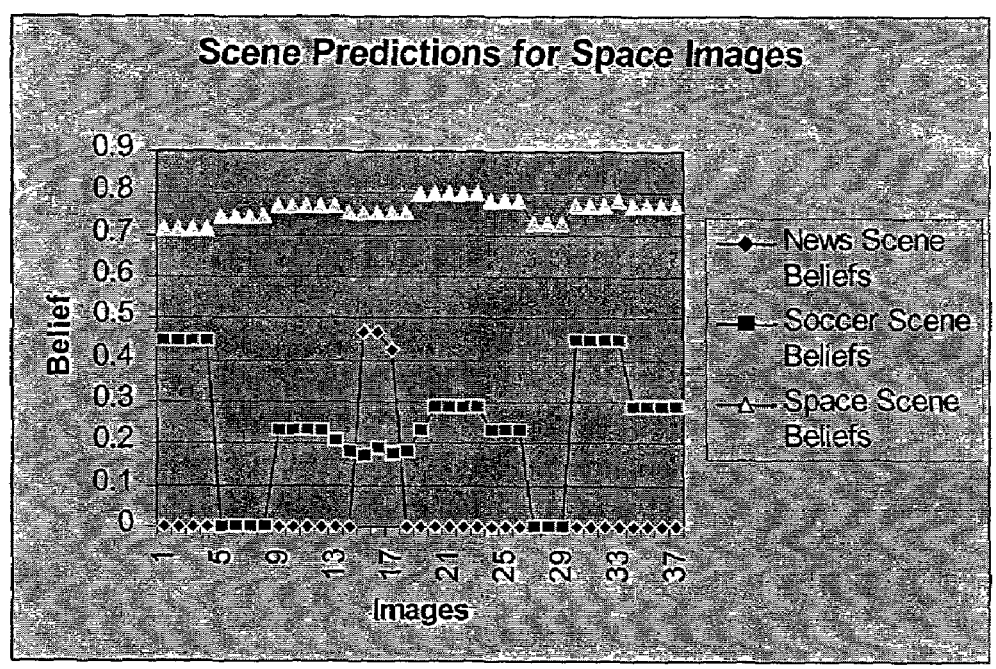
FIG. 7 depicts a chart graphing belief versus images for scene prediction for space images according to an exemplary embodiment of the present invention.
Figure 8:
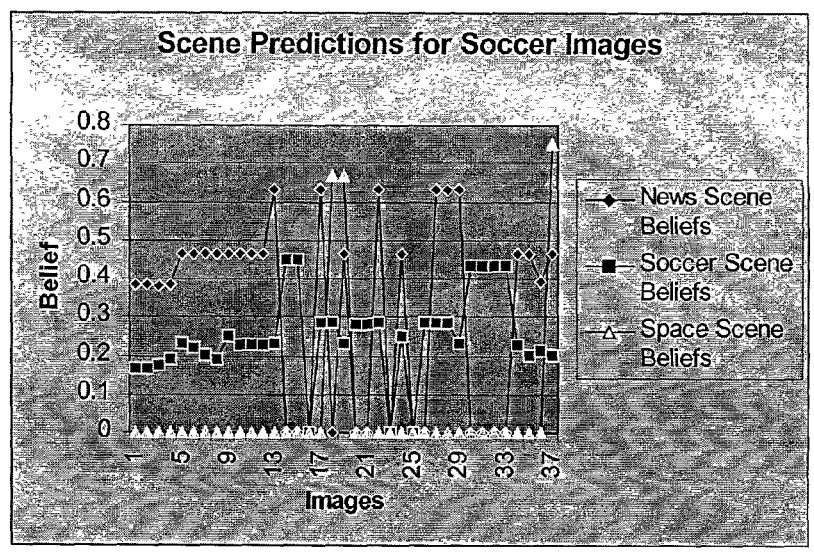
FIG. 8 depicts a chart graphing belief versus image for scene prediction for soccer images according to an exemplary embodiment of the present invention.

A total of 107 images were used as test data; these were grouped into three different scene types: 33 generic news images, 37 space related images, and 37 World Cup soccer images. In testing, the recognition system was able to correctly predict the scene type for 72 of the 107 images, for a 67.29% success rate. FIGS. 6 through 8 show how this overall success rate broke down over the three scene types.

As FIGS. 6 and 7 illustrate, the system did very well when predicting the generic news scenes and the space scenes. However, FIG. 8 illustrates that only 9 of the 37 World Cup soccer images were correctly predicted. This discrepancy was caused mainly by the rules that were formed within the belief model. Although, the method that was used to create the rules is not believed to be at fault. A look at the rules used to update the beliefs in the shadow objects that represent scenes, shows the discrepancy. (In the following rules, class 11 is generic news scenes, class 12 is space scenes and class 13 is soccer scenes. See tables B.1 and B.2 for a complete list of object class and relation id definitions.)

Rules for predicting and reinforcing generic news scene shadow objects:
(belief-model (class1 2) (shadow1 1) (relation 6) (class2 11) (shadow2 1) (mean 0.8334) (stddev 0.3727) (prob 0.8334))
(belief-model (class1 4) (shadow1 0) (relation 6) (class2 11) (shadow2 1) (mean 1.0) (stddev 0.0) (prob 1.0))
(belief-model (class1 5) (shadow1 1) (relation 6) (class2 11) (shadow2 1) (mean 1.0) (stddev 0.0) (prob 1.0))
(belief-model (class1 23) (shadow1 0) (relation 6) (class2 11) (shadow2 1) (mean 0.5) (stddev 0.5) (prob 0.5))

Rules for predicting and reinforcing space scene shadow objects:
(belief-model (class1 6) (shadow1 1) (relation 6) (class2 12) (shadow2 1) (mean 1.0) (stddev 0.0) (prob 1.0))
(belief-model (class1 7) (shadow1 0) (relation 6) (class2 12) (shadow2 1) (mean 1.0) (stddev 0.0) (prob 1.0))
(belief-model (class1 8) (shadow1 0) (relation 6) (class2 12) (shadow2 1) (mean 1.0) (stddev 0.0) (prob 1.0))

Rules for predicting and reinforcing soccer scene shadow objects:
(belief-model (class1 1) (shadow1 1) (relation 6) (class2 13) (shadow2 1) (mean 0.5313) (stddev 0.4990) (prob 0.5313))
(belief-model (class1 3) (shadow1 0) (relation 6) (class2 13) (shadow2 1) (mean 0.5294) (stddev 0.4991) (prob 0.5294))
(belief-model (class1 9) (shadow1 1) (relation 6) (class2 13) (shadow2 1) (mean 0.6471) (stddev 0.4779) (prob 0.6471))
(belief-model (class1 10) (shadow1 1) (relation 6) (class2 13) (shadow2 1) (mean 1.0) (stddev 0.0) (prob 1.0))
(belief-model (class1 23) (shadow1 0) (relation 1) (class2 13) (shadow2 1) (mean 0.5) (stddev 0.5) (prob 0.5))

Recalling from above that the belief in an object is the mean of the weighted probabilities of the object's parents, and that the weighting is accomplished by using the probability of the prevalence of a relationship between the object and its parents, the discrepancy becomes clear. The weighting probability is taken from the belief model rule that relates an object (in this case scene shadow objects) to their parents. In the above rules, this is the prob value. As can be seen, the prob values associated with the rules that are used to reinforce the belief in soccer scenes (class 13) are quite low in comparison to the values in the generic news scene and space scene rules. This indicates that, in the training data, objects which showed some significant relationship to soccer scenes, showed a relatively much lower degree of significance than those objects seen to be significant to generic news scenes and space scenes. This problem could be solved in several ways.

1. An improved method of calculating belief values could be implemented. As was mentioned already above, the method currently employed is very simplistic and will definitely contribute to any fuzziness seen in the belief values of predicted objects.
2. New recognition experts could be added that are more capable of producing objects which are better able to separate the target recognition objects. This method would provide an overall improvement in the prediction of all shadow objects.
3. Additional training data could be acquired which will allow more significant relations to be formed between the soccer scene shadow objects and other defined objects.
4. New objects, which would more significantly relate to soccer scene shadow objects, could be defined.
5. An attempt could be made to alter the belief model so that the reinforcement of the generic news and space scenes is more in line with the soccer scene reinforcements. Although this is not recommended since it is likely that the only thing that would be accomplished by this would be to lower the overall scene prediction performance of the recognition system.

An additional effect would appear if there were a detection of an object, false or otherwise, in a soccer scene, which is used to reinforce or predict another type of scene. If this occurs there is a better chance that the wrong scene will be predicted than there would be if the same case occurred in a generic news scene or a space scene. Again, this is because of the stronger reinforcement of generic news scenes and space scenes.

General Shadow Object Prediction

Figure 9:
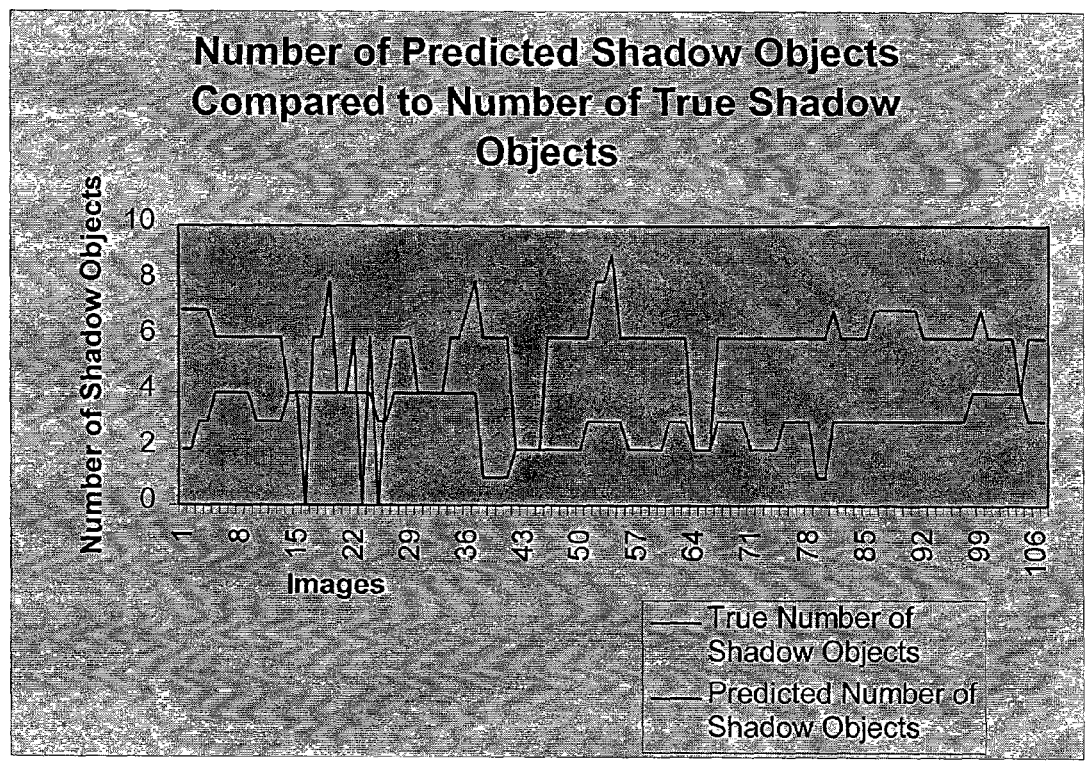
FIG. 9 depicts a chart graphing number of shadow objects versus images for number of predicted shadow objects compared to number of true shadow objects according to an exemplary embodiment of the present invention.

In general the recognition system was able to predict the existence of all of the shadow objects present in an image. However, the system made multiple false predictions for each image as well. FIG. 9 shows the relationship of the number of true shadow objects per image to the number of shadow objects predicted in all 107 test images.

Figure 10:
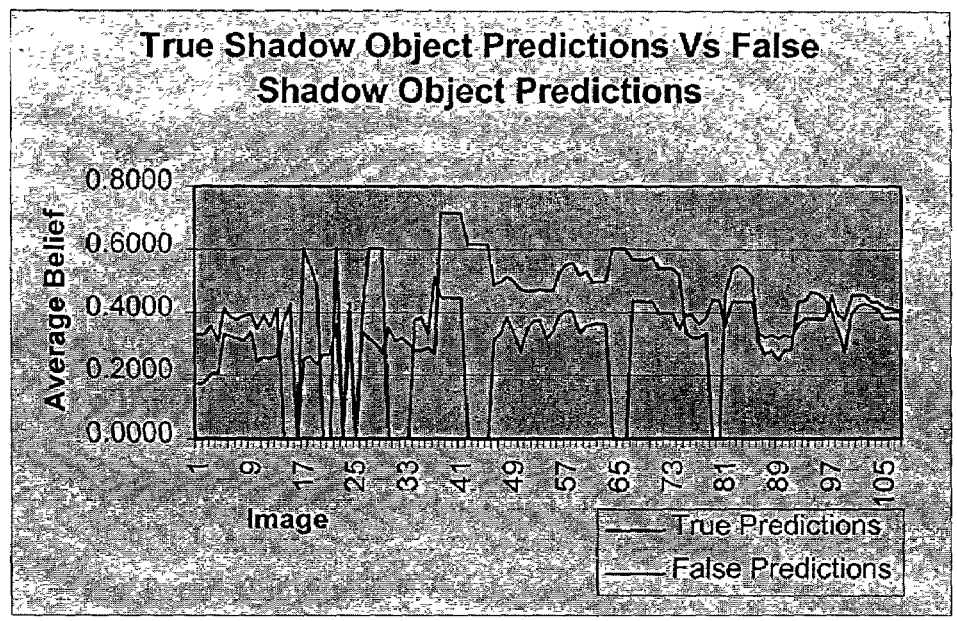
FIG. 10 depicts a chart graphing average belief versus image for true shadow object predictions against false shadow object predictions according to an exemplary embodiment of the present invention.
Figure 11:
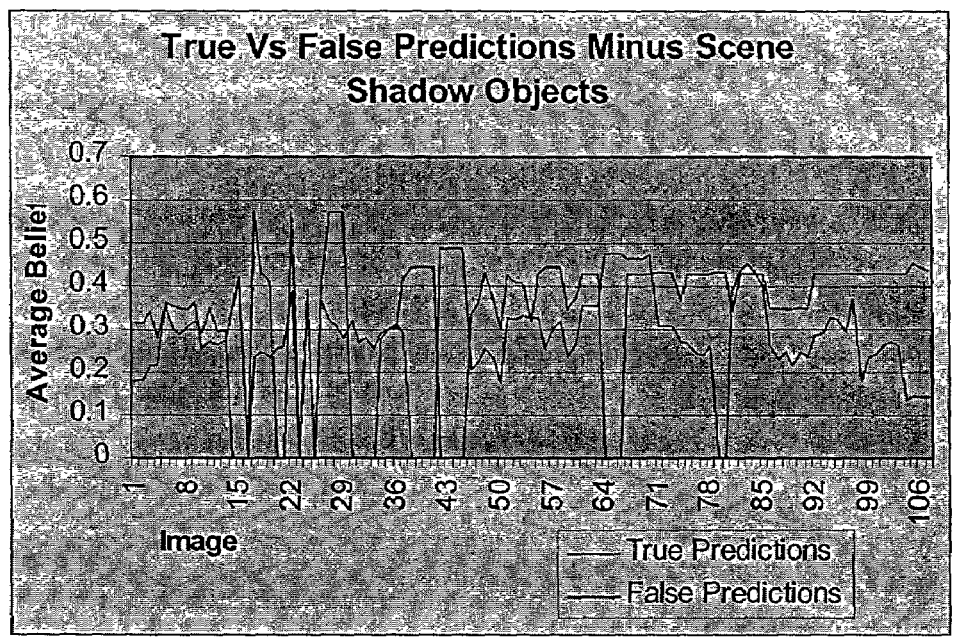
FIG. 11 depicts a chart graphing average belief versus image for true shadow object predictions against false shadow object predictions minus scene shadow objects according to an exemplary embodiment of the present invention.

The extra predictions in each image would not pose a problem if it were possible to discriminate between the false predictions and the true predictions based belief values. FIG. 10, however, shows that there was only one area of clear separation between the average belief values of true and false predictions. This separation occurred within the space images (images 39–76). The reason for the separation is attributable to the high belief values of the space scene shadow objects, which averaged above 0.7. FIG. 11 shows a re-plot of the data in FIG. 10 with the belief values of all scene shadow objects removed. As can be seen the removal of these values removed the separation seen in FIG. 10. The ambiguity in the non-scene shadow objects is attributable to the some of the same factors that caused soccer scenes to be predicted with a low degree of reliability.

If we look at the rules used to predict the non-scene shadow objects we can see that they have for the most part prob values <0.6.

Rules for predicting and reinforcing person shadow objects:
(belief-model (class1 2) (shadow1 1) (relation 1) (class2 1) (shadow2 1) (mean 0.5) (stddev 0.5) (prob 0.5))
(belief-model (class1 2) (shadow1 1) (relation 6) (class2 1) (shadow2 1) (mean 0.5) (stddev 0.5) (prob 0.5))
(belief-model (class1 3) (shadow1 0) (relation 3) (class2 1) (shadow2 1) (mean 1.1 176) (stddev 1.1823) (prob 0.6471))
(belief-model (class1 4) (shadow1 0) (relation 6) (class2 1) (shadow2 1) (mean 0.75) (stddev 0.4330) (prob 0.75))
(belief-model (class 1 8) (shadow1 0) (relation 2) (class2 1) (shadow2 1) (mean 1.0) (stddev 0.0) (prob 1.0))
(belief-model (class1 8) (shadow1 0) (relation 3) (class2 1) (shadow2 1) (mean 0.5) (stddev 0.5) (prob 0.5))
(belief-model (class1 9) (shadow1 1) (relation 2) (class2 1) (shadow2 1) (mean 0.8235) (stddev 0.9843) (prob 0.5294))
(belief-model (class1 9) (shadow1 1) (relation 3) (class2 1) (shadow2 1) (mean 0.8824) (stddev 0.9629) (prob 0.5294))
(belief-model (class1 9) (shadow1 1) (relation 7) (class2 1) (shadow2 1) (mean 0.5882) (stddev 0.5999) (prob 0.52941))
(belief-model (class1 10) (shadow1 1) (relation 1) (class2 1) (shadow2 1) (mean 0.6667) (stddev 0.47141) (prob 0.6667))
(belief-model (class1 10) (shadow1 1) (relation 2) (class2 1) (shadow2 1) (mean 1.1667) (stddev 1.0672) (prob 0.6667))
(belief-model (class1 10) (shadow1 1) (relation 3) (class2 1) (shadow2 1) (mean 1.5) (stddev 0.9574) (prob 0.8334))
(belief-model (class1 10) (shadow1 1) (relation 4) (class2 1) (shadow2 1) (mean 1.3333) (stddev 0.9428) (prob 0.8334))
(belief-model (class 1 1) (shadow1 1) (relation 5) (class2 1) (shadow2 1) (mean 1.1429) (stddev 0.8329) (prob 0.8571))
(belief-model (class1 13) (shadow1 1) (relation 5) (class2 1) (shadow2 1) (mean 2.125) (stddev 1.2686) (prob 0.75))
(belief-model (class1 21) (shadow1 0) (relation 1) (class2 1) (shadow2 1) (mean 1.2917) (stddev 1.2741) (prob 0.5834))
(belief-model (class1 21) (shadow1 0) (relation 2) (class2 1) (shadow2 1) (mean 0.9583) (stddev 1.1719) (prob 0.5))
(belief-model (class1 21) (shadow1 0) (relation 3) (class2 1) (shadow2 1) (mean 1.125) (stddev 1.2353) (prob 0.5417))
(belief-model (class1 21) (shadow1 0) (relation 4) (class2 1) (shadow2 1) (mean 1.1667) (stddev 1.14261) (prob 0.625))
(belief-model (class1 23) (shadow1 0) (relation 1) (class2 1) (shadow2 1) (mean 0.5) (stddev 0.5) (prob 0.5))
(belief-model (class1 23) (shadow1 0) (relation 2) (class2 1) (shadow2 1) (mean 0.5) (stddev 0.5) (prob 0.5))
(belief-model (class1 23) (shadow1 0) (relation 3) (class2 1) (shadow2 1) (mean 0.5) (stddev 0.5) (prob 0.5))
(belief-model (class1 24) (shadow1 0) (relation 4) (class2 1) (shadow2 1) (mean 0.8) (stddev 0.9381) (prob 0.52))

Rules for predicting and reinforcing face shadow objects:
(belief-model (class1 4) (shadow1 0) (relation 2) (class2 2) (shadow2 1) (mean 1.0) (stddev 0.0) (prob 1.0))
(belief-model (class 1 4) (shadow1 0) (relation 4) (class2 2) (shadow2 1) (mean 0.5) (stddev 0.5) (prob 0.5))
(belief-model (class1 5) (shadow1 1) (relation 2) (class2 2) (shadow2 1) (mean 0.6667) (stddev 0.4714) (prob 0.6667))
(belief-model (class1 1) (shadow1 1) (relation 5) (class2 2) (shadow2 1) (mean 0.714233) (stddev 0.4518) (prob 0.7143))
(belief-model (class 1 20) (shadow1 0) (relation 2) (class2 2) (shadow2 1) (mean 0.5600) (stddev 0.4964) (prob 0.5600))
(belief-model (class1 23) (shadow1 0) (relation 1) (class2 2) (shadow2 1) (mean 0.5) (stddev 0.5) (prob 0.5))
(belief-model (class. 23) (shadow1 0) (relation 2) (class2 2) (shadow2 1) (mean 0.5) (stddev 0.5) (prob 0.5))
(belief-model (class1 23) (shadow1 0) (relation 3) (class2 2) (shadow2 1) (mean 0.5) (stddev 0.5) (prob 0.5))

Rules for predicting and reinforcing inset shadow objects:
(belief-model (class1 23) (shadow1 0) (relation 6) (class2 5) (shadow2 1) (mean 0.5) (stddev 0.5) (prob 0.5))

Rules for predicting and reinforcing earth shadow objects:
(belief-model (class1 7) (shadow1 0) (relation 1) (class2 6) (shadow2 1) (mean 0.75) (stddev 0.82915619758885 01) (prob 0.5))
(belief-model (class1 7) (shadow1 0) (relation 3) (class2 6) (shadow2 1) (mean 0.875) (stddev 0.9270248108869579) (rob 0.5))
(belief-model (class1 7) (shadow1 0) (relation 4) (class2 6) (shadow2 1) (mean 0 625) (stddev 0 6959705453537528) (prob 0 5))
(belief-model (class1 12) (shadow1 1) (relation 5) (class2 6) (shadow2 1) (mean 1.5714) (stddev 1.3997) (prob 0.5714))

Rules for predicting and reinforcing field shadow objects:
(belief-model (class1 10) (shadow1 1) (relation 1) (class2 9) (shadow2 1) (mean 0.5) (stddev 0.5) (prob 0.5))
(belief-model (class1 10) (shadow1 1) (relation 2) (class2 9) (shadow2 1) (mean 1.1667) (stddev 0.6872) (prob 0.8333))

(belief-model (class 1 0) (shadow 1 1) (relation 3) (class2 9) (shadow2 1) (mean 0.8333) (stddev 0.6872) (prob 0.6667))
(belief-model (class1 10) (shadow1 1) (relation 4) (class2 9) (shadow2 1) (mean 0.6667) (stddev 0.7454) (prob 0.5))
(belief-model (class1 13) (shadow1 1) (relation 5) (class2 9) (shadow2 1) (mean 1.375) (stddev 1.1110) (prob 0.75))
(belief-model (class1 21) (shadow1 0) (relation 4) (class2 9) (shadow2 1) (mean 0.875) (stddev 0.8809) (prob 0.5833))

Rules for predicting and reinforcing ball shadow objects:
(belief-model (class1 13) (shadow1 1) (relation 5) (class2 10) (shadow2 1) (mean 0.75) (stddev 0.4330) (prob 0.75))
(belief-model (class1 21) (shadow1 0) (relation 4) (class2 10) (shadow2 1) (mean 0.5417) (stddev 0.4983) (prob 0.5417))

These rules show that, like in the case of soccer scenes, there were very few objects in the training data possessing highly significant relationships with any of the non-scene shadow objects. In rules where the prob values were >0.6, which would indicate a significant relationship, it can be seen that the indicated relationship is between two shadow objects. Although such rules are not unwanted, they should not be in the majority nor should they always provide the greatest degree of reinforcement. Shadow objects are, after all, only predictions of what may exist in an image. If an initial set of predictions begins to spawn others, the reliability of those subsequent predictions will become less and less the further removed they are from the original set.

It was somewhat disappointing, that the rules showing relationships between shadow objects and objects produced by the image processing experts, did not show more significant relationships. Had these relationships been more significant or had better image processing experts been available, we believe the prediction of shadow objects would have been much more accurate. As it stands, given the ambiguous nature of the experts used, the success have achieved is encouraging.

It has been shown that the Blackboard framework of the present invention is capable of accepting actual image processing processes as experts, and of utilizing the output of those experts. It was possible to create a belief model that was capable of predicting correct scene classifications in our test data with a >0.67 percent accuracy. The belief model was also capable of predicting the possible existence of 6 non-scene shadow objects, although the final belief values of these object rendered the discrimination between true and false predictions to be somewhat ambiguous.

The results show that even with a less than perfect set of image processing experts and an overly simplified belief network, it was possible to combine the output from the experts and get useful results. If a more sophisticated belief network was implemented and a more specialized set of image processing experts and relation functions used, we believe that the ambiguity in non-scene shadow object prediction could be reduced while at the same time improving the scene prediction results.

Generic News Scenes

A total of 33 images of generic news footage were selected and processed. Table 3 shows the overall results for each of the images.

TABLE 3

| | Number of Real Objects In Image | Number Found | Average Belief | False Hits | Average Belief | Missed Objects | Number Of Shadow Objects In Image | Number Predicted | Average Belief | False Hits | Average Belief | Scene Prediction (C/I) | Belief |
|---|---|---|---|---|---|---|---|---|---|---|---|---|---|
| Image 1 | 89 | 89 | 0.8355 | 0 | 0.0000 | 0 | 3 | 3 | 0.3352 | 3 | 0.3901 | C | 0.4667 |
| Image 2 | 76 | 75 | 0.8049 | 1 | 0.2353 | 1 | 3 | 3 | 0.3173 | 3 | 0.3901 | C | 0.4667 |
| Image 3 | 100 | 100 | 0.8026 | 1 | 0.2353 | 0 | 3 | 3 | 0.3168 | 3 | 0.3620 | C | 0.4667 |
| Image 4 | 79 | 78 | 0.8107 | 1 | 0.2353 | 1 | 3 | 3 | 0.3327 | 3 | 0.3801 | C | 0.4667 |
| Image 5 | 122 | 121 | 0.7514 | 2 | 0.4527 | 1 | 1 | 0 | 0.0000 | 6 | 0.4382 | I | 0.6207 |
| Image 6 | 139 | 138 | 0.7487 | 2 | 0.4527 | 1 | 1 | 0 | 0.0000 | 6 | 0.4382 | I | 0.6207 |
| Image 7 | 145 | 145 | 0.7038 | 0 | 0.0000 | 0 | 3 | 3 | 0.4548 | 4 | 0.3534 | C | 0.5832 |
| Image 8 | 139 | 139 | 0.8135 | 0 | 0.0000 | 0 | 3 | 3 | 0.5379 | 3 | 0.4332 | C | 0.7451 |
| Image 9 | 135 | 135 | 0.8116 | 0 | 0.0000 | 0 | 3 | 3 | 0.5499 | 3 | 0.4332 | C | 0.7451 |
| Image 10 | 143 | 143 | 0.8062 | 0 | 0.0000 | 0 | 3 | 3 | 0.5388 | 3 | 0.4332 | C | 0.7451 |
| Image 11 | 146 | 146 | 0.7824 | 0 | 0.0000 | 0 | 3 | 3 | 0.5150 | 3 | 0.4332 | C | 0.7451 |
| Image 12 | 157 | 155 | 0.6007 | 1 | 0.2353 | 2 | 3 | 3 | 0.3052 | 4 | 0.3332 | C | 0.3893 |
| Image 13 | 133 | 131 | 0.5121 | 1 | 0.2353 | 2 | 3 | 3 | 0.2651 | 4 | 0.3181 | C | 0.3369 |
| Image 14 | 125 | 123 | 0.5379 | 1 | 0.2353 | 2 | 3 | 3 | 0.2786 | 4 | 0.3258 | C | 0.3395 |
| Image 15 | 153 | 151 | 0.5153 | 1 | 0.2353 | 2 | 3 | 3 | 0.2487 | 4 | 0.3146 | C | 0.3108 |
| Image 16 | 118 | 116 | 0.5716 | 1 | 0.2353 | 2 | 3 | 3 | 0.2799 | 4 | 0.3263 | C | 0.3404 |
| Image 17 | 95 | 93 | 0.5591 | 1 | 0.2353 | 2 | 3 | 3 | 0.2805 | 4 | 0.3192 | C | 0.3686 |
| Image 18 | 119 | 119 | 0.8404 | 2 | 0.2353 | 0 | 3 | 3 | 0.4342 | 3 | 0.3617 | C | 0.7326 |
| Image 19 | 148 | 148 | 0.8210 | 1 | 0.2353 | 0 | 3 | 3 | 0.4379 | 3 | 0.3795 | C | 0.7326 |
| Image 20 | 138 | 138 | 0.8470 | 1 | 0.2353 | 0 | 3 | 3 | 0.4637 | 3 | 0.3795 | C | 0.7326 |
| Image 21 | 137 | 137 | 0.8506 | 1 | 0.2353 | 0 | 3 | 3 | 0.4612 | 3 | 0.3795 | C | 0.7326 |
| Image 22 | 153 | 153 | 0.8367 | 1 | 0.2353 | 0 | 3 | 3 | 0.4395 | 3 | 0.3795 | C | 0.7326 |
| Image 23 | 81 | 80 | 0.8090 | 0 | 0.0000 | 1 | 3 | 3 | 0.4035 | 3 | 0.4543 | I | 0.5096 |
| Image 24 | 67 | 66 | 0.6754 | 1 | 0.2353 | 1 | 4 | 3 | 0.3346 | 3 | 0.3901 | C | 0.4667 |
| Image 25 | 59 | 58 | 0.5860 | 1 | 0.2353 | 1 | 4 | 4 | 0.2745 | 3 | 0.3768 | C | 0.3860 |
| Image 26 | 65 | 65 | 0.8097 | 0 | 0.0000 | 0 | 4 | 3 | 0.3975 | 3 | 0.4543 | I | 0.5096 |
| Image 27 | 56 | 56 | 0.7569 | 0 | 0.0000 | 0 | 4 | 3 | 0.4215 | 3 | 0.4543 | I | 0.5096 |
| Image 28 | 56 | 56 | 0.8149 | 0 | 0.0000 | 0 | 4 | 3 | 0.4277 | 3 | 0.4543 | I | 0.5096 |
| Image 29 | 61 | 61 | 0.7909 | 0 | 0.0000 | 0 | 4 | 3 | 0.4187 | 3 | 0.4344 | C | 0.4667 |
| Image 30 | 60 | 60 | 0.8147 | 0 | 0.0000 | 0 | 4 | 1 | 0.4092 | 3 | 0.4344 | I | 0.4499 |
| Image 31 | 31 | 29 | 0.8901 | 1 | 0.2353 | 2 | 3 | 2 | 0.3786 | 4 | 0.4168 | C | 0.4667 |
| Image 32 | 21 | 19 | 0.7829 | 1 | 0.2353 | 2 | 3 | 2 | 0.3786 | 4 | 0.4127 | C | 0.4667 |
| Image 33 | 19 | 17 | 0.7179 | 1 | 0.2353 | 2 | 3 | 2 | 0.3786 | 4 | 0.4052 | C | 0.4667 |

Space Scenes

A total of 37 images of space related footage were selected and processed. Table shows the overall results for each of the images.

TABLE 4

| | Number of Real Objects In Image | Number Found | Average Belief | FALSE Hits | Average Belief | Missed Objects | Number of Shadow Objects In Image | Number Predicted | Average Belief | FALSE Hits | Average Belief | Scene Prediction (C/I) | Belief |
|---|---|---|---|---|---|---|---|---|---|---|---|---|---|
| Image 1 | 13 | 13 | 0.6961 | 1 | 0.67 | 0 | 1 | 1 | 0.7138 | 5 | 0.4449 | C | 0.7138 |
| Image 2 | 24 | 24 | 0.8514 | 1 | 0.67 | 0 | 1 | 1 | 0.7138 | 5 | 0.4449 | C | 0.7138 |
| Image 3 | 10 | 10 | 0.7784 | 1 | 0.67 | 0 | 1 | 1 | 0.7138 | 5 | 0.4449 | C | 0.7138 |
| Image 4 | 21 | 21 | 0.8547 | 1 | 0.67 | 0 | 1 | 1 | 0.7138 | 5 | 0.4449 | C | 0.7138 |
| Image 5 | 52 | 52 | 0.7108 | 0 | 0 | 0 | 2 | 2 | 0.6168 | 0 | 0.0000 | C | 0.7457 |
| Image 6 | 12 | 12 | 0.4824 | 0 | 0 | 0 | 2 | 2 | 0.6168 | 0 | 0.0000 | C | 0.7457 |
| Image 7 | 37 | 37 | 0.8349 | 0 | 0 | 0 | 2 | 2 | 0.6168 | 0 | 0.0000 | C | 0.7457 |
| Image 8 | 10 | 10 | 0.5107 | 0 | 0 | 0 | 2 | 2 | 0.6168 | 0 | 0.0000 | C | 0.7457 |
| Image 9 | 119 | 118 | 0.7596 | 2 | 0.2353 | 1 | 2 | 2 | 0.4895 | 4 | 0.3103 | C | 0.7703 |
| Image 10 | 114 | 113 | 0.7434 | 2 | 0.2353 | 1 | 2 | 2 | 0.4972 | 4 | 0.3322 | C | 0.7703 |
| Image 11 | 121 | 120 | 0.7153 | 2 | 0.2353 | 1 | 2 | 2 | 0.5127 | 4 | 0.3833 | C | 0.7703 |
| Image 12 | 126 | 125 | 0.7579 | 2 | 0.2353 | 1 | 2 | 2 | 0.5010 | 4 | 0.3329 | C | 0.7703 |
| Image 13 | 128 | 127 | 0.7292 | 3 | 0.2353 | 1 | 2 | 2 | 0.4739 | 4 | 0.2748 | C | 0.7703 |
| Image 14 | 136 | 132 | 0.7900 | 5 | 0.2353 | 4 | 3 | 3 | 0.4701 | 3 | 0.3438 | C | 0.7538 |
| Image 15 | 136 | 132 | 0.6942 | 6 | 0.2353 | 4 | 3 | 3 | 0.4669 | 5 | 0.3711 | C | 0.7538 |
| Image 16 | 128 | 124 | 0.7499 | 4 | 0.2353 | 4 | 3 | 3 | 0.4729 | 5 | 0.3748 | C | 0.7538 |
| Image 17 | 115 | 111 | 0.5655 | 4 | 0.2353 | 4 | 3 | 3 | 0.4688 | 6 | 0.3137 | C | 0.7538 |
| Image 18 | 131 | 127 | 0.7184 | 5 | 0.2353 | 4 | 3 | 3 | 0.4701 | 3 | 0.3438 | C | 0.7538 |
| Image 19 | 92 | 90 | 0.8593 | 2 | 0.2353 | 2 | 2 | 2 | 0.5274 | 4 | 0.3904 | C | 0.8005 |
| Image 20 | 103 | 101 | 0.8666 | 2 | 0.2353 | 2 | 2 | 2 | 0.5529 | 4 | 0.4038 | C | 0.8005 |
| Image 21 | 114 | 112 | 0.8472 | 1 | 0.2353 | 2 | 2 | 2 | 0.5596 | 4 | 0.4038 | C | 0.8005 |
| Image 22 | 121 | 119 | 0.8261 | 1 | 0.2353 | 2 | 2 | 2 | 0.5175 | 4 | 0.3334 | C | 0.8005 |
| Image 23 | 113 | 111 | 0.8271 | 1 | 0.2353 | 2 | 2 | 2 | 0.5335 | 4 | 0.3545 | C | 0.8005 |
| Image 24 | 110 | 108 | 0.7614 | 2 | 0.2353 | 2 | 3 | 3 | 0.4976 | 3 | 0.3617 | C | 0.7829 |
| Image 25 | 110 | 108 | 0.7932 | 2 | 0.2353 | 2 | 3 | 3 | 0.4976 | 3 | 0.3617 | C | 0.7829 |
| Image 26 | 104 | 102 | 0.8016 | 2 | 0.2353 | 2 | 3 | 3 | 0.4976 | 3 | 0.3617 | C | 0.7829 |
| Image 27 | 84 | 83 | 0.7286 | 0 | 0 | 1 | 2 | 2 | 0.6037 | 0 | 0.0000 | C | 0.7307 |
| Image 28 | 78 | 77 | 0.7301 | 0 | 0 | 1 | 2 | 2 | 0.6037 | 0 | 0.0000 | C | 0.7307 |
| Image 29 | 72 | 71 | 0.7949 | 0 | 0 | 1 | 2 | 2 | 0.6037 | 0 | 0.0000 | C | 0.7307 |
| Image 30 | 37 | 37 | 0.7603 | 0 | 0 | 0 | 3 | 3 | 0.5672 | 3 | 0.4332 | C | 0.7703 |
| Image 31 | 38 | 38 | 0.7162 | 0 | 0 | 0 | 3 | 3 | 0.5672 | 3 | 0.4332 | C | 0.7703 |
| Image 32 | 14 | 14 | 0.6109 | 0 | 0 | 0 | 3 | 3 | 0.5672 | 3 | 0.4332 | C | 0.7703 |
| Image 33 | 36 | 34 | 0.7202 | 0 | 0 | 2 | 3 | 3 | 0.5767 | 3 | 0.4332 | C | 0.7829 |
| Image 34 | 40 | 39 | 0.7296 | 1 | 0.2353 | 1 | 2 | 2 | 0.5384 | 4 | 0.3967 | C | 0.7703 |
| Image 35 | 40 | 39 | 0.7296 | 1 | 0.2353 | 1 | 2 | 2 | 0.5384 | 4 | 0.3967 | C | 0.7703 |
| Image 36 | 40 | 39 | 0.7296 | 1 | 0.2353 | 1 | 2 | 2 | 0.5384 | 4 | 0.3967 | C | 0.7703 |
| Image 37 | 18 | 17 | 0.5235 | 1 | 0.2353 | 1 | 2 | 2 | 0.5212 | 4 | 0.3474 | C | 0.7703 |

World Cup Soccer Scenes

A total of 37 images of World Cup soccer footage were selected and processed. Table 5 shows the overall results for each of the images.

TABLE 5

| | Number of Real Objects In Image | Number Found | Average Belief | FALSE Hits | Average Belief | Missed Objects | Number of Shadow Objects In Image | Number Predicted | Average Belief | FALSE Hits | Average Belief | Scene Prediction (C/I) | Belief |
|---|---|---|---|---|---|---|---|---|---|---|---|---|---|
| Image 1 | 114 | 111 | 0.5798 | 6 | 0.2353 | 3 | 2 | 2 | 0.1733 | 5 | 0.3288 | I | 0.3838 |
| Image 2 | 132 | 130 | 0.6413 | 4 | 0.2353 | 2 | 2 | 2 | 0.1758 | 5 | 0.3288 | I | 0.3850 |
| Image 3 | 93 | 91 | 0.6349 | 3 | 0.2353 | 2 | 3 | 3 | 0.2036 | 4 | 0.3544 | I | 0.3828 |
| Image 4 | 92 | 89 | 0.6427 | 3 | 0.2353 | 3 | 3 | 3 | 0.2061 | 4 | 0.3069 | I | 0.3849 |
| Image 5 | 36 | 35 | 0.5295 | 2 | 0.2353 | 1 | 4 | 4 | 0.3299 | 2 | 0.4123 | I | 0.4667 |
| Image 6 | 42 | 41 | 0.4482 | 3 | 0.2353 | 1 | 4 | 4 | 0.3228 | 2 | 0.3846 | I | 0.4667 |
| Image 7 | 45 | 44 | 0.4384 | 4 | 0.2353 | 1 | 4 | 4 | 0.3147 | 2 | 0.3776 | I | 0.4667 |
| Image 8 | 32 | 31 | 0.5475 | 5 | 0.2353 | 1 | 4 | 4 | 0.3093 | 2 | 0.3878 | I | 0.4667 |
| Image 9 | 45 | 44 | 0.6134 | 2 | 0.2353 | 1 | 4 | 4 | 0.3376 | 2 | 0.3937 | I | 0.4667 |
| Image 10 | 31 | 27 | 0.6297 | 2 | 0.2353 | 4 | 3 | 3 | 0.2455 | 3 | 0.3490 | I | 0.4667 |
| Image 11 | 35 | 31 | 0.7761 | 2 | 0.2353 | 4 | 3 | 3 | 0.2566 | 3 | 0.3904 | I | 0.4667 |
| Image 12 | 19 | 15 | 0.5119 | 2 | 0.2353 | 4 | 3 | 3 | 0.2511 | 3 | 0.3522 | I | 0.4667 |
| Image 13 | 47 | 43 | 0.7012 | 3 | 0.3802 | 4 | 3 | 3 | 0.2595 | 3 | 0.4092 | I | 0.6326 |

TABLE 5-continued

| | Number of Real Objects In Image | Number Found | Average Belief | FALSE Hits | Average Belief | Missed Objects | Number of Shadow Objects In Image | Number Predicted | Average Belief | FALSE Hits | Average Belief | Scene Prediction (C/I) | Belief |
|---|---|---|---|---|---|---|---|---|---|---|---|---|---|
| Image 14 | 26 | 24 | 0.5351 | 0 | 0.0000 | 2 | 4 | 4 | 0.3732 | 0 | 0.0000 | C | 0.4499 |
| Image 15 | 48 | 46 | 0.8248 | 0 | 0.0000 | 2 | 4 | 4 | 0.4277 | 0 | 0.0000 | C | 0.4499 |
| Image 16 | 29 | 27 | 0.6403 | 0 | 0.0000 | 2 | 4 | 0 | 0.0000 | 0 | 0.0000 | I | 0.0000 |
| Image 17 | 48 | 45 | 0.6621 | 2 | 0.4527 | 3 | 4 | 4 | 0.2481 | 2 | 0.6029 | I | 0.6326 |
| Image 18 | 30 | 27 | 0.3800 | 3 | 0.5551 | 3 | 4 | 4 | 0.2586 | 2 | 0.5494 | I | 0.6671 |
| Image 19 | 49 | 47 | 0.5561 | 3 | 0.5551 | 2 | 4 | 4 | 0.2341 | 4 | 0.4896 | I | 0.6671 |
| Image 20 | 26 | 22 | 0.3653 | 1 | 0.2353 | 4 | 4 | 4 | 0.2634 | 0 | 0.0000 | C | 0.2803 |
| Image 21 | 46 | 41 | 0.6731 | 1 | 0.2353 | 5 | 4 | 4 | 0.2660 | 0 | 0.0000 | C | 0.2803 |
| Image 22 | 35 | 33 | 0.7476 | 2 | 0.4527 | 2 | 4 | 4 | 0.3611 | 2 | 0.6029 | I | 0.6326 |
| Image 23 | 9 | 7 | 0.5132 | 0 | 0.0000 | 2 | 4 | 0 | 0.0000 | 0 | 0.0000 | I | 0.0000 |
| Image 24 | 40 | 37 | 0.6253 | 2 | 0.2353 | 3 | 4 | 4 | 0.3376 | 2 | 0.4290 | I | 0.4667 |
| Image 25 | 38 | 36 | 0.6080 | 0 | 0.0000 | 2 | 3 | 0 | 0.0000 | 0 | 0.0000 | I | 0.0000 |
| Image 26 | 45 | 43 | 0.7476 | 1 | 0.2353 | 2 | 3 | 3 | 0.3408 | 1 | 0.3984 | C | 0.2872 |
| Image 27 | 43 | 40 | 0.7715 | 2 | 0.4527 | 3 | 4 | 4 | 0.3124 | 2 | 0.6029 | I | 0.6326 |
| Image 28 | 23 | 20 | 0.5556 | 2 | 0.4527 | 3 | 4 | 4 | 0.3014 | 2 | 0.6029 | I | 0.6326 |
| Image 29 | 34 | 32 | 0.5205 | 3 | 0.3802 | 2 | 4 | 4 | 0.2677 | 2 | 0.6029 | I | 0.6326 |
| Image 30 | 36 | 35 | 0.8859 | 0 | 0.0000 | 1 | 4 | 4 | 0.3501 | 0 | 0.0000 | C | 0.4361 |
| Image 31 | 40 | 39 | 0.7694 | 0 | 0.0000 | 1 | 4 | 4 | 0.3097 | 0 | 0.0000 | C | 0.4361 |
| Image 32 | 17 | 16 | 0.6878 | 0 | 0.0000 | 1 | 4 | 4 | 0.3182 | 0 | 0.0000 | C | 0.4361 |
| Image 33 | 29 | 28 | 0.5863 | 0 | 0.0000 | 1 | 4 | 4 | 0.3003 | 0 | 0.0000 | C | 0.4361 |
| Image 34 | 99 | 98 | 0.7733 | 2 | 0.2353 | 1 | 4 | 4 | 0.2771 | 2 | 0.3716 | I | 0.4667 |
| Image 35 | 87 | 86 | 0.8114 | 3 | 0.2353 | 1 | 4 | 4 | 0.2754 | 2 | 0.3862 | I | 0.4667 |
| Image 36 | 71 | 70 | 0.6381 | 2 | 0.2353 | 1 | 4 | 4 | 0.2880 | 3 | 0.3328 | I | 0.3917 |
| Image 37 | 77 | 76 | 0.7082 | 4 | 0.4090 | 1 | 4 | 4 | 0.2682 | 4 | 0.5120 | I | 0.7507 |

Belief Model: Definitions

Table 6 lists the Ids associated with the identifiable object classes.

TABLE 6

| Object Class | Id |
|---|---|
| Person | 1 |
| Face | 2 |
| Text | 3 |
| Microphone | 4 |
| Inset | 5 |
| Earth | 6 |
| Satellite | 7 |
| Space Suit | 8 |
| Soccer Field | 9 |
| Ball | 10 |
| Generic News Scene | 11 |
| Space Scene | 12 |
| Soccer Scene | 13 |
| Region type 0 | 14 |
| Region type 1 | 15 |
| Region type 2 | 16 |
| Unknown color | 17 |
| Black | 18 |
| Blue | 19 |
| Red | 20 |
| Green | 21 |
| Cyan | 22 |
| Magenta | 23 |

TABLE 6-continued

| Object Class | Id |
|---|---|
| Yellow | 24 |
| White | 25 |

Table 7 lists the Ids associated with the relations used in the Belief Model.

TABLE 7

| Relation Type | Id |
|---|---|
| North | 1 |
| South | 2 |
| East | 3 |
| West | 4 |
| Contains | 5 |
| Contained By | 6 |
| Adjacent To | 7 |

Belief Model: Rules (belief-model (class1 1) (shadow1 1) (relation 6) (class2 13) (shadow2 1) (mean 0.5313) (stddev 0.4990) (prob 0.5313))
(belief-model (class1 2) (shadow1 1) (relation 1) (class2 1) (shadow2 1) (mean 0 5) (stddev 0.5) (prob 0.5))
(belief-model (class1 2) (shadow1 1) (relation 1) (class2 3) (shadow2 0) (mean 0.8333) (stddev 0.6872) (prob 0.6667))
(belief-model (class1 2) (shadow1 1) (relation 1) (class2 24) (shadow2 0) (mean 1.5) (stddev 1.2583) (prob 0.6667))
(belief-model (class1 2) (shadow1 1) (relation 3) (class2 20) (shadow2 0) (mean 1.5) (stddev 1.5) (prob 0.6667))
(belief-model (class1 2) (shadow1 1) (relation 4) (class2 24) (shadow2 0) (mean 1.1667) (stddev 1.0672) (prob 0.6667))
(belief-model (class1 2) (shadow1 1) (relation 5) (class2 15) (shadow2 0) (mean 2.1667) (stddev 2.0344) (prob 0.6667))

-continued

Belief Model: Rules (belief-model (class1 2) (shadow1 1) (relation 6) (class2 1) (shadow2 1) (mean 0.5) (stddev 0 5) (prob 0.5))
(belief-model (class1 2) (shadow1 1) (relation 6) (class2 11) (shadow2 1) (mean 0 8334) (stddev 0 3727) (prob 0.8334))
(belief-model (class1 3) (shadow1 0) (relation 3) (class2 1) (shadow2 1) (mean 1 1176) (stddev 1 1823) (prob 0.6471))
(belief-model (class1 3) (shadow1 0) (relation 6) (class2 13) (shadow2 1) (mean 0.5294) (stddev 0.4991) (prob 0.5294))
(belief-model (class1 4) (shadow1 0) (relation 1) (class2 14) (shadow2 0) (mean 3 0) (stddev 1.0) (prob 1 0))
(belief-model (class1 4) (shadow1 0) (relation 1) (class2 15) (shadow2 0) (mean 11.5) (stddev 4.5) (prob 1.0))
(belief-model (class1 4) (shadow1 0) (relation 1) (class2 18) (shadow2 0) (mean 3.0) (stddev 2.0) (prob 1.0))
(belief-model (class1 4) (shadow1 0) (relation 2) (class2 2) (shadow2 1) (mean 1.0) (stddev 0.0) (prob 1.0))
(belief-model (class1 4) (shadow1 0) (relation 2) (class2 14) (shadow2 0) (mean 10.5) (stddev 3.5) (prob 1.0))
(belief-model (class1 4) (shadow1 0) (relation 2) (class2 15) (shadow2 0) (mean 40.0) (stddev 9.0) (prob 1.0))
(belief-model (class1 4) (shadow1 0) (relation 2) (class2 16) (shadow2 0) (mean 12.5) (stddev 1.5) (prob 1.0))
(belief-model (class1 4) (shadow1 0) (relation 2) (class2 18) (shadow2 0) (mean 16.5) (stddev 1.5) (prob 1.0))
(belief-model (class1 4) (shadow1 0) (relation 2) (class2 20) (shadow2 0) (mean 2.5) (stddev 0.5) (prob 1.0))
(belief-model (class1 4) (shadow1 0) (relation 2) (class2 24) (shadow2 0) (mean 5.0) (stddev 4.0) (prob 1.0))
(belief-model (class1 4) (shadow1 0) (relation 2) (class2 25) (shadow2 0) (mean 4.0) (stddev 3.0) (prob 1.0))
(belief-model (class1 4) (shadow1 0) (relation 3) (class2 14) (shadow2 0) (mean 5.25) (stddev 3.8971) (prob 0 75))
(belief-model (class1 4) (shadow1 0) (relation 4) (class2 2) (shadow2 1) (mean 0.5) (stddev 0.5) (prob 0.5))
(belief-model (class1 4) (shadow1 0) (relation 4) (class2 20) (shadow2 0) (mean 2.5) (stddev 1.5) (prob 1.0))
(belief-model (class1 4) (shadow1 0) (relation 4) (class2 24) (shadow2 0) (mean 2.0) stddev 0.0) (prob 1.0))
(belief-model (class1 4) (shadow1 0) (relation 4) (class2 25) (shadow2 0) (mean 4.0) (stddev 3.0) (prob 1.0))
(belief-model (class1 4) (shadow1 0) (relation 6) (class2 1) (shadow2 1) (mean 0.75) (stddev 0.4330) (.prob 0.75))
(belief-model (class1 4) (shadow1 0) (relation 6) (class2 11) (shadow2 1) (mean 1.0) (stddev 0.0) (prob 1.0))
(belief-model (class1 5) (shadow1 1) (relation 1) (class2 3) (shadow2 0) (mean 1 0) (stddev 0.8165) (prob 0 6667))
(belief-model (class1 5) (shadow1 1) (relation 1) (class2 14) (shadow2 0) (mean 2.3333) (stddev 2.6247) (prob 0.6667))
(belief-model (class1 5) (shadow1 1) (relation 1) (class2 16) (shadow2 0) (mean 3.0) (stddev 2.9439) (prob 0.6667))
(belief-model (class1 5) (shadow1 1) (relation 1) (class2 18) (shadow2 0) (mean 7.0) (stddev 5.3541) (prob 0.6667))
(belief-model (class1 5) (shadow1 1) (relation 2) (class2 2) (shadow2 1) (mean 0.6667) (stddev 0.4714) (prob 0.6667))
(belief-model (class1 5) (shadow1 1) (relation 2) (class2 14) (shadow2 0) (mean 2 6667) (stddev 2.0548) (prob 0.6667))
(belief-model (class1 5) (shadow1 1) (relation 2) (class2 15) (shadow2 0) (mean 10.6667) (stddev 10.5304) (prob 0.6667))
(belief-model (class1 5) (shadow1 1) (relation 2) (class2 16) (shadow2 0) (mean 1.6667) (stddev 1.2472) (prob 0.6667))
(belief-model (class1 5) (shadow1 1) (relation 3) (class2 15) (shadow2 0) (mean 7.3334) (stddev 5.4365) (prob 0.6667))
(belief-model (class1 5) (shadow1 1) (relation 3) (class2 16) (shadow2 0) (mean 2.3334) (stddev 2.6247) (prob 0.6667))
(belief-model (class1 5) (shadow1 1) (relation 4) (class2 14) (shadow2 0) (mean 1.3334) (stddev 1.2472) (prob 0.6667))
(belief-model (class1 5) (shadow1 1) (relation 4) (class2 15) (shadow2 0) (mean 1.6667) (stddev 1.2472) (prob 0.6667))
(belief-model (class1 5) (shadow1 1) (relation 4) (class2 16) (shadow2 0) (mean 1.6667) (stddev 0.9428) (prob 1.0))
(belief-model (class1 5) (shadow1 1) (relation 5) (class2 14) (shadow2 0) (mean 1.0) (stddev 0.8165) (prob 0.6667))
(belief-model (class1 5) (shadow1 1) (relation 5) (class2 15) (shadow2 0) (mean 3.6667) (stddev 3.2998) (prob 0.6667))
(belief-model (class1 5) (shadow1 1) (relation 5) (class2 16) (shadow2 0) (mean 2.0) (stddev 2.1602) (prob 0.6667))
(belief-model (class1 5) (shadow1 1) (relation 6) (class2 11) (shadow2 1) (mean 1.0) (stddev 0.0) (prob 1.0))
(belief-model (class1 6) (shadow1 1) (relation 2) (class2 25) (shadow2 0) (mean 1.6364) (stddev 1.6664) (prob 0.6364))
(belief-model (class1 6) (shadow1 1) (relation 3) (class2 25) (shadow2 0) (mean 1.4545) (stddev 1.3048) (prob 0.8182))
(belief-model (class1 6) (shadow1 1) (relation 6) (class2 12) (shadow2 1) (mean 1.0) (stddev 0.0) (prob 1.0))
(belief-model (class1 7) (shadow1 0) (relation 1) (class2 6) (shadow2 1) (mean 0.75) (stddev 0.8292) (prob 0.5))
(belief-model (class1 7) (shadow1 0) (relation 1) (class2 16) (shadow2 0) (mean 3.375) (stddev 4.0601) (prob 0.875))
(belief-model (class1 7) (shadow1 0) (relation 2) (class2 15) (shadow2 0) (mean 6.625) (stddev 6.3035) (prob 0.75))
(belief-model (class1 7) (shadow1 0) (relation 3) (class2 6) (shadow2 1) (mean 0.875) (stddev 0.9270) (prob 0.5))
(belief-model (class1 7) (shadow1 0) (relation 4) (class2 6) (shadow2 1) (mean 0.625) (stddev 0.696) (prob 0.5))
(belief-model (class1 7) (shadow1 0) (relation 5) (class2 18) (shadow2 0) (mean 2.875) (stddev 2.7128) (prob 0.75))
(belief-model (class1 7) (shadow1 0) (relation 6) (class2 12) (shadow2 1) (mean 1.0) (stddev 0.0) (prob 1.0))
(belief-model (class1 8) (shadow1 0) (relation 2) (class2 1) (shadow2 1) (mean 1 0) (stddev 0.0) (prob 1.0))
(belief-model (class1 8) (shadow1 0) (relation 3) (class2 1) (shadow2 1) (mean 0.5) (stddev 0.5) (prob 0.5))
(belief-model (class1 8) (shadow1 0) (relation 4) (class2 25) (shadow2 0) (mean 3.0) (stddev 1.7321) (prob 0.75))
(belief-model (class1 8) (shadow1 0) (relation 5) (class2 15) (shadow2 0) (mean 4.0) (stddev 2.3452) (prob 0.75))
(belief-model (class1 8) (shadow1 0) (relation 6) (class2 12) (shadow2 1) (mean 1.0) (stddev 0.0) (prob 1.0))
(belief-model (class1 9) (shadow1 1) (relation 2) (class2 1) (shadow2 1) (mean 0.82353) (stddev 0.9843) (prob 0.5294))
(belief-model (class1 9) (shadow1 1) (relation 3) (class2 1) (shadow2 1) (mean 0.8824) (stddev 0.963) (prob 0.5294))
(belief-model (class1 9) (shadow1 1) (relation 6) (class2 13) (shadow2 1) (mean 0.6471) (stddev 0.4779) (prob 0.6471))
(belief-model (class1 9) (shadow1 1) (relation 7) (class2 1) (shadow2 1) (mean 0.5882) (stddev 0.5999) (prob 0.5294))
(belief-model (class1 10) (shadow1 1) (relation 1) (class2 1) (shadow2 1) (mean 0.6667) (stddev 0.4714) (prob 0.6667))
(belief-model (class1 10) (shadow1 1) (relation 1) (class2 9) (shadow2 1) (mean 0.5) (stddev 0.5) (prob 0.5))
(belief-model (class1 10) (shadow1 1) (relation 2) (class2 1) (shadow2 1) (mean 1.16667) (stddev 1.0672) (prob 0.6667))
(belief-model (class1 10) (shadow1 1) (relation 2) (class2 3) (shadow2 0) (mean 1.1667) (stddev 0.8975) (prob 0.6667))
(belief-model (class1 10) (shadow1 1) (relation 2) (class2 9) (shadow2 1) (mean 1.1667) (stddev 0.6872) (prob 0.8334))
(belief-model (class1 10) (shadow1 1) (relation 2) (class2 16) (shadow2 0) (mean 2.1667) (stddev 1.675) (prob 0.6667))
(belief-model (class1 10) (shadow1 1) (relation 3) (class2 1) (shadow2 1) (mean 1.5) (stddev 0.95743) (prob 0.8334))
(belief-model (class1 10) (shadow1 1) (relation 3) (class2 9) (shadow2 1) (mean 0.8334) (stddev 0.6872) (prob 0.6667))
(belief-model (class1 10) (shadow1 1) (relation 3) (class2 16) (shadow2 0) (mean 1 0) (stddev 0 8165) (prob 0.6667))
(belief-model (class1 10) (shadow1 1) (relation 3) (class2 18) (shadow2 0) (mean 5.8334) (stddev 8.1938) (prob 0.8334))
(belief-model (class1 10) (shadow1 1) (relation 4) (class2 1) (shadow2 1) (mean 1.3334) (stddev 0.9428) (prob 0.8334))
(belief-model (class1 10) (shadow1 1) (relation 4) (class2 9) (shadow2 1) (mean 0.6667) (stddev 0.7454) (prob 0.5))
(belief-model (class1 10) (shadow1 1) (relation 4) (class2 18) (shadow2 0) (mean 2.667) (stddev 4.2295) (prob 0 6667))
(belief-model (class1 10) (shadow1 1) (relation 6) (class2 13) (shadow2 1) (mean 1.0) (stddev 0.0) (prob 1.0))
(belief-model (class1 11) (shadow1 1) (relation 2) (class2 14) (shadow2 0) (mean 2.4286) (stddev 1.9898) (prob 0.7143))
(belief-model (class1 11) (shadow1 1) (relation 3) (class2 16) (shadow2 0) (mean 2.0) (stddev 1.6036) (prob 0.8571))
(belief-model (class1 11) (shadow1 1) (relation 4) (class2 14) (shadow2 0) (mean 1.7143) (stddev 1.2778) (prob 0 7143))
(belief-model (class1 11) (shadow1 1) (relation 5) (class2 1) (shadow2 1) (mean 1.1429) (stddev 0.833) (prob 0.8571))
(belief-model (class1 11) (shadow1 1) (relation 5) (class2 2) (shadow2 1) (mean 0.7143) (stddev 0.4518) (prob 0.7143))

-continued

Belief Model: Rules (belief-model (class1 11) (shadow1 1) (relation 5) (class2 3) (shadow2 0) (mean 0.8571) (stddev 0.6389) (prob 0.7143))
(belief-model (class1 12) (shadow1 1) (relation 3) (class2 16) (shadow2 0) (mean 1.5714) (stddev 1.0498) (prob 0.7143))
(belief-model (class1 12) (shadow1 1) (relation 3) (class2 18) (shadow2 0) (mean 1.5714) (stddev 1.1780) (prob 0.7143))
(belief-model (class1 12) (shadow1 1) (relation 5) (class2 6) (shadow2 1) (mean 1.5714) (stddev 1.3997) (prob 0.5714))
(belief-model (class1 12) (shadow1 1) (relation 5) (class2 7) (shadow2 0) (mean 1.1429) (stddev 0.6389) (prob 0.8571))
(belief-model (class1 13) (shadow1 1) (relation 3) (class2 18) (shadow2 0) (mean 1.875) (stddev 2.1469) (prob 0.75))
(belief-model (class1 13) (shadow1 1) (relation 5) (class2 1) (shadow2 1) (mean 2.125) (stddev 1.2686) (prob 0.75))
(belief-model (class1 13) (shadow1 1) (relation 5) (class2 3) (shadow2 0) (mean 1.125) (stddev 0.9270) (prob 0.625))
(belief-model (class1 13) (shadow1 1) (relation 5) (class2 9) (shadow2 1) (mean 1.375) (stddev 1.1110) (prob 0.75))
(belief-model (class1 13) (shadow1 1) (relation 5) (class2 10) (shadow2 1) (mean 0.75) (stddev 0.4330) (prob 0.75))
(belief-model (class1 13) (shadow1 1) (relation 5) (class2 16) (shadow2 0) (mean 1.875) (stddev 2.7585) (prob 0.75))
(belief-model (class1 16) (shadow1 0) (relation 7) (class2 18) (shadow2 0) (mean 1.04091) (stddev 1.1374) (prob 0.6045))
(belief-model (class1 19) (shadow1 0) (relation 3) (class2 25) (shadow2 0) (mean 1.4286) (stddev 1.4983) (prob 0.6429))
(belief-model (class1 19) (shadow1 0) (relation 7) (class2 18) (shadow2 0) (mean 0.7857) (stddev 0.6739) (prob 0.6429))
(belief-model (class1 20) (shadow1 0) (relation 2) (class2 2) (shadow2 1) (mean 0.56) (stddev 0.4964) (prob 0 56))
(belief-model (class1 21) (shadow1 0) (relation 1) (class2 1) (shadow2 1) (mean 1 2917) (stddev 1.2741) (prob 0.5834))
(belief-model (class1 21) (shadow1 0) (relation 2) (class2 1) (shadow2 1) (mean 0.9583) (stddev 1.1719) (prob 0.5))
(belief-model (class1 21) (shadow1 0) (relation 3) (class2 1) (shadow2 1) (mean 1.125) (stddev 1.2353) (prob 0 5417))
(belief-model (class1 21) (shadow1 0) (relation 4) (class2 1) (shadow2 1) (mean 1.1667) (stddev 1.1426) (prob 0.625))
(belief-model (class1 21) (shadow1 0) (relation 4) (class2 9) (shadow2 1) (mean 0.875) (stddev 0.8809) (prob 0.5834))
(belief-model (class1 21) (shadow1 0) (relation 4) (class2 10) (shadow2 1) (mean 0.5417) (stddev 0.4983) (prob 0.5417))
(belief-model (class1 22) (shadow1 0) (relation 1) (class2 16) (shadow2 0) (mean 2.5882) (stddev 4.4597) (prob 0.8235))
(belief-model (class1 22) (shadow1 0) (relation 7) (class2 18) (shadow2 0) (mean 1.0588) (stddev 0.9375) (prob 0.6471))
(belief-model (class1 23) (shadow1 0) (relation 1) (class2 1) (shadow2 1) (mean 0.5) (stddev 0.5) (prob 0.5))
(belief-model (class1 23) (shadow1 0) (relation 1) (class2 2) (shadow2 1) (mean 0.5) (stddev 0.5) (prob 0 5))
(belief-model (class1 23) (shadow1 0) (relation 1) (class2 13) (shadow2 1) (mean 0.5) (stddev 0.5) (prob 0.5))
(belief-model (class1 23) (shadow1 0) (relation 1) (class2 15) (shadow2 0) (mean 21.5) (stddev 15.5) (prob 1.0))
(belief-model (class1 23) (shadow1 0) (relation 2) (class2 1) (shadow2 1) (mean 0.5) (stddev 0.5) (prob 0.5))
(belief-model (class1 23) (shadow1 0) (relation 2) (class2 2) (shadow2 1) (mean 0.5) (stddev 0.5) (prob 0.5))
(belief-model (class1 23) (shadow1 0) (relation 3) (class2 1) (shadow2 1) (mean 0.5) (stddev 0.5) (prob 0.5))
(belief-model (class1 23) (shadow1 0) (relation 3) (class2 2) (shadow2 1) (mean 0.5) (stddev 0.5) (prob 0.5))
(belief-model (class1 23) (shadow1 0) (relation 3) (class2 14) (shadow2 0) (mean 3.5) (stddev 0.5) (prob 1.0))
(belief-model (class1 23) (shadow1 0) (relation 3) (class2 15) (shadow2 0) (mean 26.5) (stddev 10.5) (prob 1.0))
(belief-model (class1 23) (shadow1 0) (relation 3) (class2 16) (shadow2 0) (mean 9.5) (stddev 5.5) (prob 1.0))
(belief-model (class1 23) (shadow1 0) (relation 3) (class2 18) (shadow2 0) (mean 20.0) (stddev 10.0) (prob 1.0))
(belief-model (class1 23) (shadow1 0) (relation 3) (class2 20) (shadow2 0) (mean 4.5) (stddev 3.5) (prob 1.0))
(belief-model (class1 23) (shadow1 0) (relation 6) (class2 5) (shadow2 1) (mean 0.5) (stddev 0.5) (prob 0.5))
(belief-model (class1 23) (shadow1 0) (relation 6) (class2 11) (shadow2 1) (mean 0.5) (stddev 0.5) (prob 0.5))
(belief-model (class1 24) (shadow1 0) (relation 4) (class2 1) (shadow2 1) (mean 0.8) (stddev 0.9381) (prob 0.52))

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer readable medium encoded with instructions for causing a computer to recognize objects in content by following the instructions to implement:
a blackboard comprising
a plurality of experts adapted to process data on a computer, and said data comprising at least one of original input data and/or data created by processing of any of said plurality of experts, and
a controller operative to control said experts;
a belief model, coupled to said controller, comprising a set of beliefs and probabilities associated with each belief of said set of beliefs, wherein said belief model comprises a set of rules deduced from a computer-implemented learning system, said learning system comprising truth data files for deducing said set of beliefs, said probabilities and shadow objects, a learning system controller and a statistics space controlled by said learning system controller, wherein said set of rules describes how different classes recognized by said learning system are related to each other spatially and physically;
a belief network, coupled to said controller; and
a relations subsystem, coupled to said controller.

2. The computer-readable medium according to claim 1, wherein said experts comprise expert object recognizers comprising at least one of:
region identification experts;
color region experts;
a corner recognizer;
a closed curve recognizer;
a roof recognizer;
a text recognizer;
simulated experts;
microphone recognizer;
space suit recognizer;
satellite recognizer;
a geometric shape recognizer; a building recognizer;
an egg recognizer;
a dice recognizer;
a person recognizer;
a face recognizer; and/or
a product recognizer.

3. The computer-readable medium according to claim 1, wherein said data comprises at least one of:
relations data;
expert status data;
image subsection data; and/or
said belief model.

4. The computer-readable medium according to claim 1, wherein said controller is at least one of:
   operative to choose chosen experts from said plurality of experts which are to be executed;
   operative to schedule execution of said chosen experts; and/or
   operative to execute said chosen experts.

5. The computer-readable medium according to claim 1, wherein said blackboard further comprises at least one of:
   storage for receiving an input image; and/or
   a reporter operative to output results of processing.

6. The computer-readable medium according to claim 1, wherein said belief model is operative to predict existence of a shadow object in an image even if there are no specific experts capable of recognizing said shadow object.

7. The computer-readable medium according to claim 1, wherein said belief network is operative to combine beliefs in output data output by said experts and probabilities drawn from said belief model into a single belief for a given object.

8. The computer-readable medium according to claim 1, wherein said relations subsystem is operative to determine how returned objects returned by said experts are related to each other.

9. The computer-readable medium according to claim 1, wherein said relations subsystem is operative to determine spatial relations.

10. The computer-readable medium according to claim 9, wherein said spatial relations include types comprising at least one of:
    a north type, a south type, an east type, a west type,
    a contains type,
    a contained by type, and/or
    an adjacent to type.

11. The computer-readable medium according to claim 1, wherein said relations subsystem is operative to determine temporal relations.

12. The computer-readable medium according to claim 11, wherein said temporal relations include types comprising at least one of:
    a before type,
    an after type, and/or
    an exists with type.

13. The system-computer-readable medium according to claim 1, wherein the content comprises at least one of:
    video;
    an image;
    digitized content; and/or a frame.

14. The computer-readable medium according to claim 1, wherein said learning system is operative to assist in integrating a new expert, said new expert being adapted to create, encapsulate and compile said new expert; to add a stub function to said blackboard; if output of said new expert is new, to add the output to said belief model; and to add a blackboard rule to control when said new expert is to be executed.

15. The computer-readable medium of claim 1, wherein said belief network is at least one of:
    a Bayesian Network;
    a mean probability; and/or
    a Dempster-Shafer Network.

16. The computer-readable medium according to claim 1, wherein said belief model comprises:
    rules operative to be used to make a determination whether or not one of said experts should be executed by search of said belief model to determine whether an adaptable threshold of supporting evidence has been exceeded for an execution supportability rule that evaluates outputs of currently executing experts.

17. The computer-readable medium according to claim 1, wherein said belief model is operative to model expected object associations, to weigh relative object positions, and to tie a probability or belief value to those associations.

18. The computer-readable medium according to claim 1, wherein said belief network is operative to combine the belief model with hypotheses generated by said experts to form belief values for hypothesized objects.

19. A computer-readable medium encoded with instructions for causing a computer to implement a method of recognizing objects comprising:
    identifying classes of objects specified by a user using a plurality of cooperative object recognition experts;
    achieving higher accuracy from using in parallel said plurality of cooperative object recognition experts than is achievable using in serial said plurality of cooperative object recognition experts;
    supporting scaleability of performance including supporting multiple computer processors;
    developing a belief model by deducing a set of rules from a computer-implemented learning system, said learning system comprising truth data files for deducing beliefs, probabilities and shadow objects, a learning system controller and a statistics space controlled by said learning system controller, said set of rules describing how different classes recognized by said learning system are related to each other spatially and physically, the developing of said belief model including
    specifying specified associations among said objects,
    learning learned associations among said objects,
    representing said specified and learned associations, and
    forming a belief network
    wherein said belief network is at least one of a Bayesian Network and a Dempster Shafer Network; and
    deducing said shadow objects from said belief model.

20. A computer-readable medium encoded with instructions for causing a computer to implement a method for adding a new expert to a blackboard comprising:
    creating an expert adapted for processing data on a computer;
    encapsulating said expert;
    compiling said expert;
    adding a stub function to a blackboard;
    determining if output of said expert is new and if new, then
    adding the output's class to said blackboard, and
    updating a belief model by providing truth data file data to a computer-implemented learning system, said learning system comprising truth data files for deducing beliefs, probabilities and shadow objects, a learning system controller and a statistics space controlled by said learning system controller;
    creating a rule to control when said new expert is to be executed when supporting evidence is found to exceed an adaptable threshold; and
    deducing a set of rules from said learning system, said set of rules describing how different classes recognized by said learning system are related to each other spatially and physically.

* * * * *